US009576017B2

(12) United States Patent
Kummer et al.

(10) Patent No.: US 9,576,017 B2
(45) Date of Patent: Feb. 21, 2017

(54) SYSTEMS AND METHODS FOR MANAGING GRAPHICAL MODEL CONSISTENCY

(71) Applicant: Software AG, Darmstadt (DE)

(72) Inventors: Thomas Kummer, Saarbruecken (DE); Markus Brueck, Saarbruecken (DE)

(73) Assignee: SOFTWARE AG, Darmstadt (DE)

( * ) Notice: Subject to any disclaimer, the term of this patent is extended or adjusted under 35 U.S.C. 154(b) by 155 days.

(21) Appl. No.: 14/170,975

(22) Filed: Feb. 3, 2014

(65) Prior Publication Data
US 2015/0220589 A1    Aug. 6, 2015

(51) Int. Cl.
G06F 17/30    (2006.01)
(52) U.S. Cl.
CPC .............................. G06F 17/30371 (2013.01)
(58) Field of Classification Search
USPC ................................ 707/690; 715/810, 764
See application file for complete search history.

(56) References Cited

U.S. PATENT DOCUMENTS

| 6,052,691 | A | 4/2000 | Ardoin et al. |
| 6,678,882 | B1 | 1/2004 | Hurley et al. |
| 7,028,057 | B1 | 4/2006 | Vasudevan et al. |
| 7,703,071 | B2 | 4/2010 | Kuester et al. |
| 7,818,283 | B1 | 10/2010 | Bajpay et al. |
| 8,046,733 | B2 | 10/2011 | Weber |
| 8,286,132 | B2 | 10/2012 | Yuan et al. |
| 8,630,975 | B1 * | 1/2014 | Guo ...................... G06N 7/005 |
| | | | 707/608 |
| 2004/0034651 | A1 * | 2/2004 | Gupta ............... G06F 17/30932 |
| 2004/0177343 | A1 | 9/2004 | McVoy et al. |
| 2007/0179828 | A1 | 8/2007 | Elkin et al. |
| 2007/0226681 | A1 | 9/2007 | Thorup |
| 2007/0266377 | A1 | 11/2007 | Ivanov |

(Continued)

FOREIGN PATENT DOCUMENTS

| CN | 101398852 | 4/2009 |
| WO | WO 00/67156 | 11/2000 |

OTHER PUBLICATIONS

Smirnov, S., "Business Process Model Abstraction," Business Process Technology Group, Nov. 2011 (168 pp.).

(Continued)

Primary Examiner — Hung T Vy
(74) Attorney, Agent, or Firm — Nixon & Vanderhye, P.C.

(57) ABSTRACT

In certain example embodiments, a system is configured to check consistency between a first computer-represented graphical model and a second computer-represented graphical model. The system includes a data storage device and at least one processor that is incorporated into or accessible to a server. The data storage device includes or stores model correlation information, e.g., in a mapping table form. The model correlation information is configured to define at least one relationship type between the first model and the second model. The model correlation information includes a mapping of objects of the first model to objects of the second model at creation time of the model correlation information. The processor is configured to perform a model consistency check procedure that uses the model correlation information including the relationship type to ascertain an inconsistency between extant versions of the first model and the second model.

28 Claims, 26 Drawing Sheets

(56) References Cited

U.S. PATENT DOCUMENTS

| | | | |
|---|---|---|---|
| 2008/0147693 A1 | 6/2008 | Clemm et al. | |
| 2009/0249281 A1 | 10/2009 | Fritzsche et al. | |
| 2009/0265684 A1 | 10/2009 | Fuchs et al. | |
| 2010/0191555 A1 | 7/2010 | Shmul | |
| 2011/0029947 A1 | 2/2011 | Markovic | |
| 2011/0161874 A1* | 6/2011 | Doughty | G06F 8/33 715/810 |
| 2011/0265060 A1 | 10/2011 | Fritzsche et al. | |
| 2012/0143923 A1* | 6/2012 | Whitney | G06F 17/30997 707/803 |
| 2012/0166246 A1 | 6/2012 | Simon | |
| 2012/0210294 A1 | 8/2012 | Göres | |
| 2013/0104099 A1 | 4/2013 | Göres | |
| 2014/0218385 A1* | 8/2014 | Carmi | G09G 5/377 345/590 |
| 2015/0057981 A1* | 2/2015 | Gross | G01S 5/06 703/1 |

OTHER PUBLICATIONS

Brocke, J., "Service-Oriented Architectures-SOAs: Management and Controlling of Business Processes," pp. 55-74, Copyright 2008 [original and translation].
http://www.oracle.com/technetwork/middleware/bpel/overview/ds-bpel-11gr1-1-134826.pdf, Oracle SOA Suite: BPEL Process Engine/Human Workflow, retrieved Feb. 3, 2014.
http://www.oracle.com/technetwork/middleware/bpa/overview/oracle-bpasuite-11-datasheet-1-130499.pdf, Oracle BPA Suite, retrieved Feb. 3, 2014.
http://www.softwareag.com/us/Images/SAG_BPMS_FS_Apr10-web_tcm89-33867.pdf, WebMethods BPMS, retrieved Feb. 3, 2014.
http://www.ids-scheer.de/de/ARIS/ARIS_Platform/ARIS_SOA_Architect/7784.html, ARIS SOA Architect, retrieved Feb. 3, 2014.
http://www.pega.com/Products/SmartBPM-business-rules.asp, PegaSystems BPMS, retrieved Feb. 3, 2014.
Masuoka, R., et al., "Task Computing—The Semantic Web Meets Pervasive Computing," Jan. 1, 2003, pp. 866-881, XP-002486064.
Event-Driven Process Chain, Wikipedia, Oct. 27, 2010, XP-002628850 http://en.wikipedia.org/w/index.php?title=Event-driven_process_chain.
Lee, J.; Park, M. S. (2003): Integration and composition of web service-based business processes. In: Journal of Computer Information Systems, pp. 82-92, retrieved from http://www.alibusiness.com/technology/computer-software-progamming/1151342-1.html, on Feb. 8, 2011.
Agrawal, A. et al. (2007a): Web Services Human Task (WS-HumanTask), Version 1.0.—URL retrieved from http://incubator.apache.org/hise/WS-HumanTask_v1.pdf, on Feb. 8, 2011.
Yu, T.; Lin, K.-J. (2005): Service selection algorithms for web services with end-to-end QoS constraints. In: Information Systems and e-Business Management, vol. 3, No. 2, pp. 103-126.
TEXO Infrastructure for Internet-Based Services, retrieved from http://www.theseus-programm.de/anwendungsszenarien/texo/default.aspx (translation), on Feb. 8, 2011.
C. Batini et al., "A Comparative Analysis of Methodologies for Database Schema Integration," ACM Computing Surveys, vol. 18, No. 4, pp. 323-364, Dec. 1986.
Susan Davidson et al., "Semantics of Database Transformations," University of Pennsylvania Scholarly Commons, Database Research Group (CIS), 2008. [online] [retrieved Oct. 25, 2011] http://repository.upenn.edu/db_research/20/.
Rachel A. Pottinger et al., "Merging Models Based on Given Correspondences," Proceedings of the 29th VLDB Conference, Berlin, Germany, 2003. [online] [retrieved Oct. 6, 2011] http://www.cs.ubc.ca/~rap/publications/pottinger-bernstein-vldb03.pdf.
Erhard RAHM et al., "A Survey of Approaches to Automatic Schema Matching," The VLDB Journal 10, pp. 334-350, 2001.
Phillip A. Bernstein et al., "A Vision for Management of Complex Models." [online] [retrieved Oct. 6, 2011] http://db.cs.washington.edu/papers/sigmodrecord.pdf.
DeveloperWorks. Comparing and Merging UML Models in IBM Rational Software Architect: Part 1—Comparing Models with Local History. [online] [retrieved Oct. 6, 2011] http://www.ibm.com/developerworks/rational/library/05/712_comp/.
DeveloperWorks. Comparing and Merging UML Models in IBM Rational Software Architect: Part 2—Merging Models Using "Compare with Each Other." [online] [retrieved Oct. 24, 2011] http://www.ibm.com/developerworks/rational/library/05/712_comp2/.
OMG Unified Modeling Language (OMG UML), Superstructure, V2.1.2, Nov. 2007. [online] [Oct. 6, 2011] http://www.omg.org/spec/UML/2.1.2/Superstructure/PDF/.
David S. Frankel, "Model Driven Architecture: Applying MDA to Enterprise Computing," Copyright 2003.
Richard Soley et al., "Model Driven Architecture," Object Management Group, 2000.
Dr. Gsvp Raju et al., "Roundtrip Engineering Using Unified Modeling Language with Rational Rose and JAVA," International Journal of Computer Applications, vol. 10, No. 10, Nov. 2010, pp. 28-34.
IBM Redbooks—Round-trip Engineering with Rational XDE. [online] [retrieved Oct. 25, 2011] http://www.redbooks.ibm.com/abstracts/tips0219.html?open.
Stefan Dessloch et al., "Orchid: Integrating Schema Mapping and ETL," Proceedings of the 2008 International Conference of Data Engineering (ICDE), pp. 1307-1316. [online] [retrieved Oct. 25, 2011] http://disi.unitn.it/~p2p/RelatedWork/Matching/orchid.pdf.
Oracle Business Process Analysis Suite—Oracle Data Sheet. [online] [retrieved Oct. 25, 2011] www.oracle.com/us/technologies/bpm/038674.pdf.
IBM Rational Software Architect—Overview. [online] [retrieved Oct. 25, 2011] http://www-01.ibm.com/software/rational/products/swarchitect/.
IBM Rational Software Architect—Features. [online] [retrieved Oct. 25, 2011] http://www-01.ibm.com/software/rational/products/swarchitect/features/?S_CMP=wspace.
U.S. Appl. No. 13/024,646, filed Feb. 10, 2011, Göres.
Scheer, A. W., "ARIS—Business Process Modeling," Third Edition, Copyright Springer 2000.
Göres, J., "A Model Management Framework for Information Integration," Dissertation Nov. 27, 2009.
Nedo Balaban et al., "Business Process Performance Management: Theoretical and Methodological Approach and Implementation," Management Information Systems, Feb. 15, 2011. http://www.ef.uns.ac.rs/mis/archive-pdf/2011%20-%20No4/MIS2011_4_1.pdf.
Sandy Kemsley, "Business & IT: Sharing the Vision of Enterprise BPM," Software AG WebMethods ARIS Platform, May 31, 2011. http://www.softwareag.com/tr/Images/sec_SAG_ARIS-wM_BusIT_WP_May11-web_tcm70-80009.pdf.
Tom Mens et al., "A Taxonomy of Model Transformation," Elsevier, Electronic Notes in Theoretical Computer Science, vol. 152, Mar. 27, 2006.
L. Bendix et al., "The Case for Batch Merge of Models—Issues and Challenges," Models and Evolution Workshop, Oslo, Norway, Oct. 3, 2010.
P. Brosch et al., "Representation and Visualization of Merge Conflicts with UML Profiles," Models and Evolution Workshop 2010, Vienna University of Technology.
M. Koegel et al., "Collaborative Model Merging," Technische Universitat München, Institute für Informatik, Aug. 4, 2010.
C. Bartelt, "Consistence Preserving Model Merge in Collaborative Development Processes," Software Systems Engineering Group, University of Clausthal, CVSM '08, May 17, 2008, Leipzip, Germany.
IBM, "Merging Versions of a Model to Resolve Conflicts", screenshot taken from http://publib.boulder.ibm.com/infocenter/rsahelp/v8/index.jsp?topic=/com.ibm.xtools.comparemerge.doc/topics/thome.html.
SpringerLink—Abstract, "Model Driven Engineering Languages and Systems", Lecture Notes in Computer Science, 2009, vol.

(56) References Cited

OTHER PUBLICATIONS

5795/2009, 167-180, DOI: 10.1007/978-3-642-04425-0_13, screenshot taken from http://www.springerlink.com/content/qz115n1594227356/.

\* cited by examiner

TABLE GRAPHS

| ID | NAME | NOTATION |
|---|---|---|
| 1 | SOURCE | BPMN |
| 2 | TARGET | BPMN |

*Fig. 27A*

TABLE NODES

| ID | GRAPH_ID | NAME | SYMBOL |
|---|---|---|---|
| 1 | 1 | START | EVENT |
| 2 | 1 | STAND UP | TASK |
| 3 | 1 | CHECK IF TIME UNTIL NEXT BUS IS LESS THAN 10 MIN | TASK |
| 4 | 1 | GATEWAY | GATEWAY |
| 5 | 1 | TAKE BUS | TASK |
| 6 | 1 | WALK | TASK |
| 7 | 1 | GATEWAY | GATEWAY |
| 8 | 1 | WORK | TASK |
| 9 | 1 | END | EVENT |
| 10 | 2 | START EVENT | EVENT |
| 11 | 2 | STANDUP | TASK |
| 12 | 2 | GO TO WORK | TASK |
| 13 | 2 | WORK | TASK |
| 14 | 2 | END | EVENT |

*Fig. 27B*

TABLE EDGES

| ID | GRAPH_ID | SOURCE_NODE_ID | TARGET_NODE_ID |
|---|---|---|---|
| 1 | 1 | 1 | 2 |
| 2 | 1 | 2 | 3 |
| 3 | 1 | 3 | 4 |
| 4 | 1 | 4 | 5 |
| 5 | 1 | 4 | 6 |
| 6 | 1 | 5 | 7 |
| 7 | 1 | 6 | 7 |
| 8 | 1 | 7 | 8 |
| 9 | 1 | 8 | 9 |
| 10 | 2 | 10 | 11 |
| 11 | 2 | 11 | 12 |
| 12 | 2 | 12 | 13 |
| 13 | 2 | 13 | 14 |

*Fig. 27C*

TABLE RELATIONSHIPS

| ID | SOURCE_GRAPH_ID | TARGET_GRAPH_ID | RELATIONSHIP_TYPES |
|---|---|---|---|
| 1 | 1 | 2 | ABSTRACTION |

*Fig. 27D*

TABLE MAPPINGS

| ID | RELATIONSHIP_ID | SOURCE_NODE_ID | TARGET_NODE_ID |
|---|---|---|---|
| 1 | 1 | 1 | 10 |
| 2 | 1 | 2 | 11 |
| 3 | 1 | 3 | 12 |
| 4 | 1 | 4 | 12 |
| 5 | 1 | 5 | 12 |
| 6 | 1 | 6 | 12 |
| 7 | 1 | 7 | 12 |
| 8 | 1 | 8 | 13 |
| 9 | 1 | 9 | 14 |

*Fig. 27E*

SYSTEMS AND METHODS FOR MANAGING GRAPHICAL MODEL CONSISTENCY

TECHNICAL FIELD

Certain example embodiments described herein relate to techniques, methods, systems, servers, and client devices for managing one or more relationships between two or more computer-represented graphical models in order to keep the models consistent in their relationship.

BACKGROUND AND SUMMARY OF EXAMPLE EMBODIMENTS

A business process is a continuous series of enterprise tasks, undertaken to help create valuable output for an internal or external customer. A business process gives organizational actions structure across time, place, and/or functions. Business processes in general represent one way to describe, analyze, execute, and/or control operational structures across departments, business units, and/or even business partners. Business process management (BPM) relates to, among other things, the continuous improvement of business processes, e.g., for the sake of overall business success. Amongst others, software-enabled business process automation is an instrument that may help increase efficiency and effectiveness of process execution.

Business process models have been established to specify processes within BPM projects. For automation purposes, for example, business process models may help document and structure conceptual process requirements (business view) prior to their transformation into executable (code-based) specifications (technical view). Both modeling and transformation are typically involved in sound process automation.

With respect to business process modeling, it is noted that business process models typically describe the logical and timely flow of a business process in a map. They may, for example, help visualize process activities as graphical symbols and connect them to a linear order. Logical operators may indicate when the flow splits into alternative or parallel paths, when they merge into one again, etc. This so-called control flow typically is at the core of each business process model. It may be complemented by additional model elements that differ depending on the perspective. For instance, a conceptual-organizational perspective (business view) may target the organizational process context including intra- and inter-organizational division of labor, interaction between human activities, their technical support, product outcome, etc. The modeling language event-driven process chain (EPC) has prevailed as a de facto standard for such conceptual business processes. It complements process activities (business process steps) by organizational resources responsible, input required, output produced, etc., supporting software application systems, organizational objectives, risks, etc. While being rather easy to use even by non-technical process analysts, it does include important information on the logical flow, which makes it a semi-formal requirements basis for technical process implementation. It generally is at the transformation from conceptual into technical business process models where business process modeling changes the perspective from organizational design into technical engineering.

Thus, a "model" may generally describe one or more complex application artifacts (e.g., business processes, data structures, structure and behavior of software systems or other technical and/or business components, etc.) in a formalized fashion. A model can use modeling primitives and/or conventions of a well-defined "abstract language," which oftentimes is referred to as a metamodel. Some common metamodels are the UML family of modeling languages (e.g., UML class diagrams, UML collaboration diagrams, etc.), the BPMN metamodel, the ARTS family of modeling languages (EPC, VAC, FAD, etc.), the entity-relationship (meta)model (ERM), the relational (meta) model, etc. A metamodel, being an abstract language, may be thought of as a collection of modeling elements that can be used or "instantiated" to describe the actual models. For instance, in a UML class diagram, modeling elements include classes, associations, properties, etc., whereas the model elements in the relational model include relations and their attributes. These modeling elements can be arranged in a variety of well-defined ways to build formal models representing potentially complex business and/or technical processing or other flows.

A common trait of many metamodels is that corresponding models can be represented as a graph including nodes and edges, which collectively can be referred to as the graph's "elements." Computer systems handling different "kinds" of models (e.g., so-called model management systems) often use some kind of graph model as an internal representation for all kinds of models.

Some models can be transformed into a semantically related model of a different (or sometimes the same) model type. The ARIS model transformation, provided by the assignee, includes a graphical way to describe transformation patterns, as discussed in detail in (for example) U.S. Publication No. 2009/0265684, the entire contents of which are hereby incorporated herein by reference. A transformation pattern includes a source pattern, a target pattern, and a mapping. The source pattern can be understood as a graphical query over the input model(s) that describes the structures of the source model to be found and transformed. Each region of the input model that conforms to the structure described by a source pattern can be considered a match for this rule. A transformation pattern's target pattern describes what elements and structures of the target model type are to be created for each match. The structure that is created in the result model for each match can be called a fragment.

U.S. Publication No. 2013/0104099, the entire contents of which are hereby incorporated herein by reference, describes selective change propagation techniques for model-to-model transformations. As an example, U.S. Publication No. 2013/0104099 provides an automated approach for propagating (or pulling up) business relevant changes made in a technical model (e.g., BPMN model) to the business-oriented model (e.g., EPC model).

To briefly summarize portions of the foregoing, information is often managed in graph-based knowledge systems. In these systems, information is modeled and managed in the form of graphs (e.g., business processes, data type definitions, UML, etc.). A graph contains information about the relations of the objects that form the graph. In many cases the graphs also have relationships between each other. For example, an abstract high level business process has a refinement relationship to another more detailed representation of the same process that characterizes the process in the real world.

For sake of general illustration, various examples of graph relationships are illustrated in FIGS. 1-6 and described below. FIGS. 1-2 depict a relationship between an abstract process and an enhanced process, FIGS. 3-4 depict a relationship reflecting different views on a same business process, and FIGS. 5-6 depict a relationship between different notations of a same process.

FIG. 1 shows an abstract business process for an order in a warehouse. Abstract business processes like that of the FIG. 1 are, for example, created during an early phase of a process automation project. FIG. 2 shows the same process in a more detailed/enhanced way than the abstract version of the process. More detailed processes are, for example, created during a later phase of a process automation process. The detailed process has a relationship to the abstract process, e.g., in that it may contain all of the steps that are defined in the abstract process, but it can have additional elements to optimize, improve, or otherwise further describe the process. For example, the detailed process of FIG. 2 has an additional loop to check if the requested item will be available in the near future.

FIGS. 3-4 describe the same business processes, but from different perspectives. The process in FIG. 3 shows a credit application process from the perspective of a bank employee, whereas the process shown in FIG. 4 shows the same process from the perspective of a customer of the bank. It can in some instances be desirable to provide the same process modeled from different perspectives, e.g., for the purpose of documentation (in this case, one document for the customer and a different document for the employee). These two processes have a relationship such that, if one process is changed, it is necessary to check if the other process also needs to be adapted.

FIGS. 5-6 show an example of the same process existing in two different notations. Processes are usually only stored in one notation, but in some use case or migration scenarios, it may be desirable to store the same process in different notations. An example case is a Model-to-Execute use case, which bridges a gap between business-defined and technically-defined models. The process in FIG. 5 is the same as the process in FIG. 6, and only the notation of the process was changed from EPC notation to BPMN2 notation. Thus, both processes show the same process, and if one of the models is changed, the other process should be adapted to keep both processes in synchronization.

In current systems, the relationship between graphs is: (1) not managed by the system, (2) only managed for single nodes of the graph, and/or (3) maintained in only one direction. A way to help reduce synchronization efforts involves introducing abstract processes such as those described by S. Smirnov in "Business Process Model Abstraction" (Business Process Technology Group, Hasso Plattner Institute, University of Potsdam, Potsdam, Germany), November 2011. The approach described therein seeks to minimize the synchronization effort between different processes if they have an enhancement relationship. The approach of introducing abstract process does not help the user to find inconsistency if one of the processes has been changed. Abstraction also does not provide a solution for other relationship types.

WO 2000/067156 and U.S. Pat. No. 6,052,691 essentially pertain to updates of nodes of graphs, defining only a relationship on nodes where, if one node is the active node, a set of depending nodes is updated if the active node is changed. This technique has deficiencies and disadvantages.

One example of such a disadvantage relates to the inability to define a relationship between graphs. If a relationship between two graphs should be managed by the system, then the relationship has to be defined for every node of the graph. If a new node is added to a graph, the user has to add the relationship manually for the new node.

Another example disadvantage relates to the inability to transfer changes in both directions. For example, if the active node is changed, the depending nodes are updated. However, it is not possible to transfer changes from the depending nodes to the active node.

Yet another example disadvantage is that the relationship is restricted to a refinement relationship (one active node as source and a set of depending nodes). It thus is not really possible to handle relationships that depend on, for example, connections of the active and depending nodes.

Certain example embodiments address one or more of these and/or other problems, e.g., by facilitating a model consistency check procedure that checks consistency between computer-represented graphical models (referred to herein interchangeably as both "graphs" and "models'), and does so using appropriately constructed model correlation information. As used herein, a "graphical model" includes any model, including any model that may be a graph-based model that includes one or more nodes and one or more edges.

In certain example embodiments, a system is configured to check consistency between a first computer-represented graphical model and a second computer-represented graphical model. The system comprises, e.g., a data storage device and a processor, which may be incorporated into or accessible to a server, for example. The data storage device includes or stores model correlation information. The model correlation information is configured to define at least one relationship type between the first model and the second model. In addition, the model correlation information comprises a mapping of objects of the first model to objects of the second model at a time that the model correlation information is created. An "object" of a model may include, for example, nodes, connectors, operators, etc., illustrated in a graph of the model. The processor is configured to perform a model consistency check procedure that uses the model correlation information including the relationship type to ascertain an inconsistency between extant versions of the first model and the second model (e.g., as model creation is taking place, or thereafter). An "extant" version of a model is any version of a model for which a request is made for analysis or comparison, and thus may also be referred to as a "specified" or "compared" version of a model. While in some instances an extant version of a model may be a most recent or current version of a model, any available or accessible version of a model may be considered an "extant" version. In certain example embodiments, the model correlation information comprises a bidirectional mapping of the objects of the first model to the objects of the second model at a time the model correlation information is created. In certain example embodiments, the at least one relationship type has been selected at the time of creation from plural potential relationship types.

In accordance with an example embodiment, the system may also comprise a client device. The client device itself may comprise at least one processor that is configured to provide a user client with a client device interface. The client device interface is configured to facilitate: creation of the model correlation information; initiation of a model consistency check procedure as executed by the processor of the server; and, in an example embodiment, resolution of an inconsistency detected by the model consistency check procedure.

In accordance with an example embodiment, the technology disclosed herein also features a server of a computer system configured to check consistency between a first computer-represented graphical model and a second computer-represented graphical model. The server comprises an interface and at least one processor. The interface is configured to receive the model correlation information. The processor is configured to use the model correlation information including the relationship type to ascertain an inconsistency between extant versions of the first model and the second model. Moreover, in an example embodiment, the at least one processor of the server is configured to create the model correlation information by generating input prompts. A first such input prompt solicits input specifying the at least one relationship type between the first model and the second model. A second such input prompt solicits a mapping of the objects of the first model to the objects of the second model.

In another of its aspects, the technology disclosed herein concerns a client device for use in a system configured to check consistency between a first computer-represented graphical model and a second computer-represented graphical model. The client device comprises a user interface and at least one processor. The at least one processor is configured to execute a client application program comprising coded instructions stored on non-transitory media, execution of the coded instructions of the client application program causing a prompting for client device user input to facilitate various actions. Such actions include, e.g., creation, in a data store of the system, model correlation information that defines at least one relationship type between the first model and the second model and that comprises a mapping of objects of the first model and the second model; initiation, by a server of the system, of a model consistency check procedure which uses the model correlation information including the relationship type to ascertain an inconsistency between extant versions of the first model and the second model; and resolution of the inconsistency detected by the model consistency check procedure.

In another of its example aspects, the technology disclosed herein concerns a non-transitory computer-readable storage medium tangibly storing instructions that, when executed by a processor of a client device, prompt for input to facilitate the aforementioned client device actions.

In another of its example aspects, the technology disclosed herein concerns methods of checking consistency between a first computer-represented graphical model and a second computer-represented graphical model. Aspects of such methods may be performed, in whole or in part, by the system(s), server(s), and/or client(s) described herein.

An example embodiment relates to a method comprising an act of obtaining model correlation information which defines at least one relationship type between the first model and the second model and which comprises a mapping of objects of the first model to objects of the second model at a time the model correlation information is created. The method further comprises at least one processor using the model correlation information including the relationship type to ascertain an inconsistency between extant versions of the first model and the second model.

In another example embodiment, the method may further comprise the at least one processor attempting to resolve or reconcile the inconsistency, e.g., by prompting for a corrective input to resolve the inconsistency and resolving the inconsistency in accordance with the corrective input.

The at least one relationship between the first model and the second model may be of one or several types. Such relationship types may be, for example: (A) an enhancement relationship; (B) an abstraction relationship; (C) a sequence relationship; (D) a connection abstraction relationship; (E) a connection enhancement relationship; and (F) a combination of two or more of (A)-(E).

In certain example embodiments, the ascertaining of the inconsistency may further comprise checking completeness of objects comprising the model correlation information against an inventory or listing of objects of the extant versions of the first model and the second model. The method may further comprise prompting for an input to resolve object incompleteness of the model correlation information. Moreover, in some example embodiments, a bidirectional checking of completeness of the objects comprising the model correlation information may be performed by finding any missing object in the second model from a perspective of the first model and finding any missing object in the first model from a perspective of the second model.

In certain example embodiments, the at least one processor of the server may create the model correlation information. Such model correlation information creating may be performed by the processor (1) generating an input prompt for input specifying the at least one relationship type between the first model and the second model, and (2) generating an input prompt to facilitate the mapping of the objects of the first model to the objects of the second model.

In at least some example embodiments, there may be more than two models. For example, model correlation information that defines at least one relationship type between the first model and both the second model and a third computer-represented graphical model may be obtained. In certain implementations, the model correlation information may also comprise a mapping of objects of at least one of the first model and the second model to objects of the third model at a time the model correlation information is created. At least one processor may use the model correlation information including the relationship type to ascertain an inconsistency between extant versions of the first model, the second model, and the third model (e.g., as model creation is taking place, or thereafter).

As a further example aspect, the technology disclosed herein may also encompass a non-transitory computer-readable storage medium tangibly storing instructions that, when executed by a processor, perform one or more of the acts or operations described herein. In certain example embodiments, the model correlation information may comprise a bidirectional mapping of the objects of the first model to the objects of the second model at a time the model correlation information is created, and the at least one relationship type has been selected at that time from plural potential relationship types.

In certain example embodiments, the technology disclosed herein includes a practical method for checking and maintaining consistency between two (or more) related processes. The consistency relation between processes can be either vertical (coarse process description vs. fine process description) or horizontal (business definition vs. technical definition, for example EPC vs. BPMN). Once the graphs are checked for inconsistencies, a guided set of options is presented to the user which aim to restore the missing consistency.

In certain example embodiments, the technology disclosed herein defines a set of relationship types between objects (enhancement, abstraction and sequence) as well as connection relationship types. Based on an initial mapping between graphs, which can be provided either manually or automatically (e.g., if one of the graphs was generated from a previously existent graph), the method checks the relationships with algorithms designed for each relationship type.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 21A and 21B are diagrammatic views depicting two example representations of an open mapping entry point for a client device according to an example embodiment;

FIGS. 27A-27E are diagrammatic views showing an example scenario of storage of model descriptive information and how model correlation information in a form of a mapping or correlation table is formed using model descriptive information according to an example embodiment.

DETAILED DESCRIPTION OF EXAMPLE EMBODIMENTS

The technology disclosed herein help serves, e.g., to resolve inconsistency between two separated graphs with a defined relationship based on a mapping (bipartite graph) between the two graphs. This approach offers the ability to manage bidirectional changes in graphs. Thus, in certain example embodiments a model consistency check procedure checks the consistency of a relationship based on mappings between the graphs. The graphs may be either directed or undirected. For the sake of simplified illustration, various examples provided herein are designed for undirected graphs to simplify matters. However, it will be appreciated that if directed graphs are used, the algorithms to detect a conflict may be adapted for some relationships.

Figure 7:
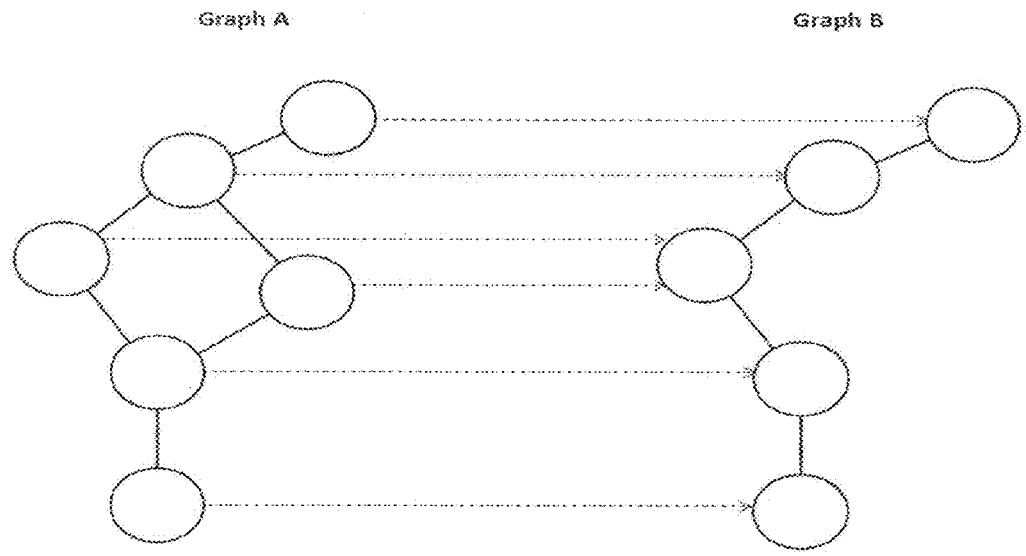
FIGS. 7-8 are diagrammatic views depicting example mappings between graphs.
Figure 8:
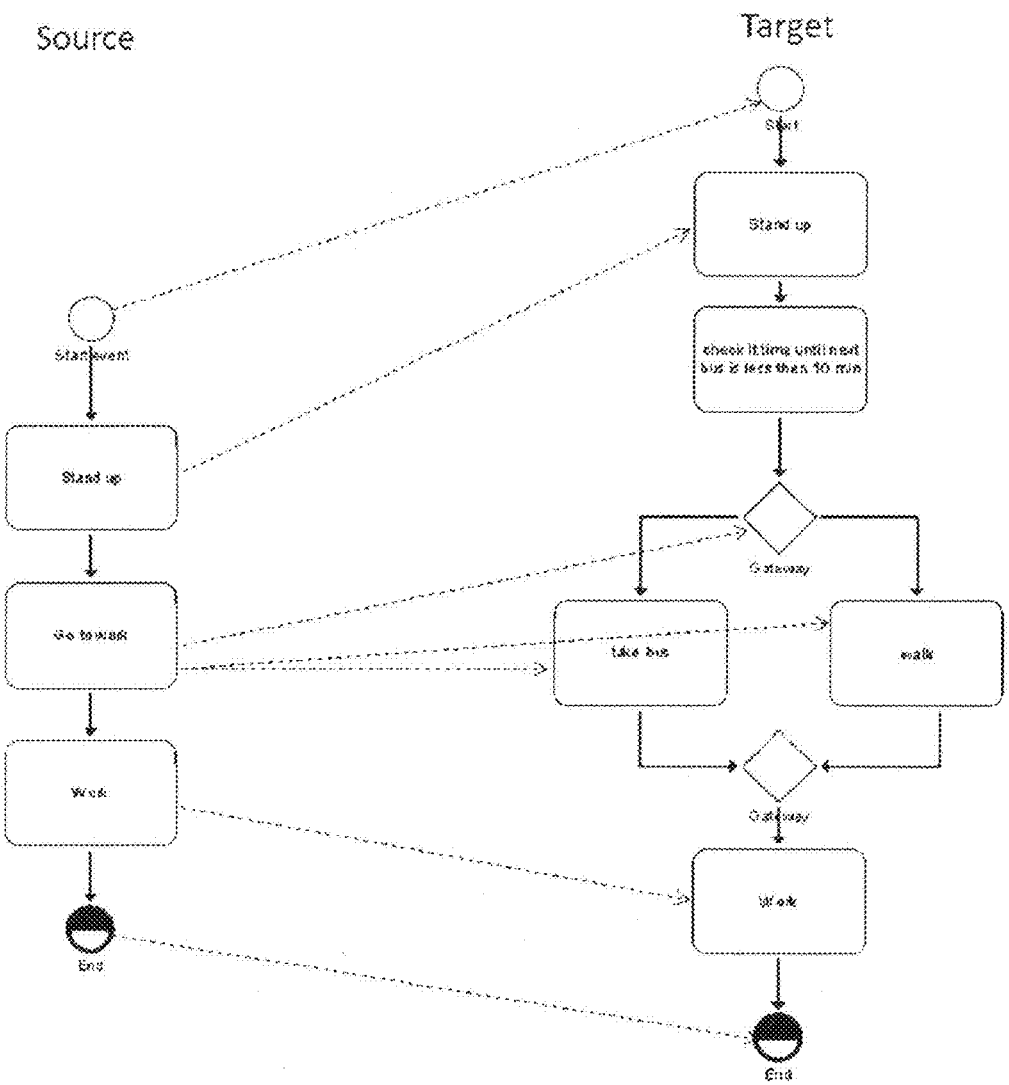

By way of further introduction, the mapping information between two graphs may comprise or consist of a set of connections between the graphs. Every mapping connection may start in one graph and ends in the other graph. For a complete and consistent mapping, every node may be mapped on at least one other node in the opposite graph. FIG. 7 shows an example mapping between graph A and graph B. The mapping information is visualized by dashed lines. FIG. 8 shows an example for a mapping between two BPMN2 process diagrams. In FIG. 8, the more abstract process (source) is mapped to the more concrete process (target).

Figure 9:
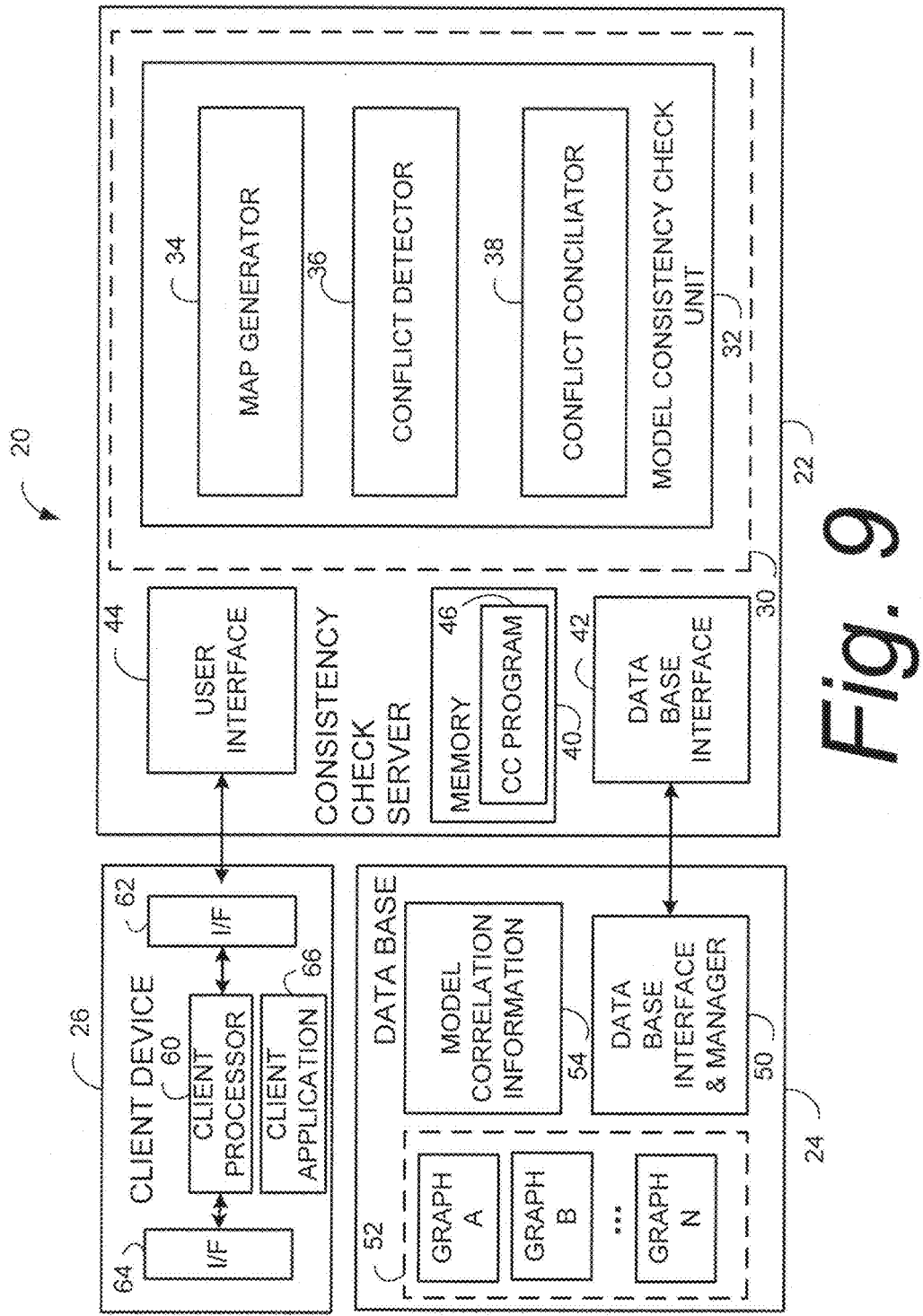
FIG. 9 is a schematic view of a system comprising a server that executes a model consistency check procedure according to an example embodiment.

FIG. 9 illustrates an example embodiment of a computerized system 20 that is configured to check consistency between a first computer-represented graphical model and a second computer-represented graphical model. A "graphical model" includes any model, including any model that may be a graph-based model that includes one or more nodes and one or more edges. The system 20, also known as a graphical model consistency system, comprises server 22, data storage device such as database 24, and client device 26.

For sake of relevance to the technology disclosed herein, server 22 is also known as consistency check server, although it should be understood that server 22 may perform varied additional functions and services, either pertinent to the technology disclosed herein or otherwise. The server 22 is illustrated as comprising an example processing section 30 that includes one or more processing unit(s). The processor(s) of processing section 30 may be local or distributed. Indeed, the server 22 need not be at one specific location or node, but may be distributed through plural locations or nodes. In an example embodiment, the processing section 30 executes a model consistency check procedure, and as such serves as a model consistency check unit 32. The processing section 30 may be dedicated to execution of the model consistency check procedure, but in most embodiments may be shared for execution with other functions, application programs, or server objectives. In certain example embodiments, model consistency check unit 32 comprises several sub-units or modules, such as map generator 34; conflict detector 36; and (as an optional additional feature and sub-unit) conflict conciliator 38, each of which is described subsequently, e.g., with reference to FIG. 10.

The server 22 further comprises server memory 40; server-to-database interface 42; and server-to-client interface 44. The server memory 40 comprises working memory (e.g., RAM) for the processing section 30, as well as (in an example embodiment) application program storage non-transient memory for storing a computer program product 46. The computer program product 46 (labeled as CC Program) comprises instructions that, when executed by processing section 30, perform the model consistency check procedure depicted by model consistency check unit 32. Such executable instructions that result in performance of the model consistency check procedure may be obtained from other forms of non-transient media, e.g., storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments.

The database 24 may comprise memory accessible to the server 22, either directly accessible by processing section 30 of the server or situated in a separate database server or device (either proximate or remote to server 22), e.g., in the manner shown by way of example in FIG. 9. The particular database 24 shown in FIG. 9 comprises database manager 50; database memory section 52 in which model descriptive information is stored; and memory section 54 in which model correlation information, also known as "mapping table" and "correlation table" may be built and/or stored. FIG. 27A-FIG. 27E, discussed below, show an example scenario of storage of model descriptive information and how model correlation information in a form of a mapping or correlation table may be formed therefrom. As shown in FIG. 9, the database memory section 52 presently has stored therein model descriptive information for models labeled as Graph A, Graph B, . . . , Graph N.

FIG. 9 further shows client device 26 as comprising client processor 60; client-to-server interface 62; client user interface 64; and client application program memory 66. In an example embodiment, client processor 60 executes a client application program the facilitates communication with server 22, and in particular for interacting with model consistency check unit 32 for the purpose of enabling a user/operator through the server 22 to generate model correlation information, to monitor or initiate one or more consistency check operations, and/or respond to prompting for resolution of any inconsistency noted by the model consistency check unit 32. This client application program may comprise a set of coded instructions stored on non-transitory computer-readable media that, when executed by client processor 60, results in performance of operations described herein. Such a client application program may be stored in on-board memory such as client application program memory 66, or other forms of non-transitory memory such as those already mentioned above. The location of client device 26 relative to server 22 is not critical. For example, client device 26 may be located at a same site or node as server 22, or may be remote with respect to server 22 (e.g., connected by any appropriate intermediate communication system such as Internet, LAN, wireless, etc.).

Figure 11:
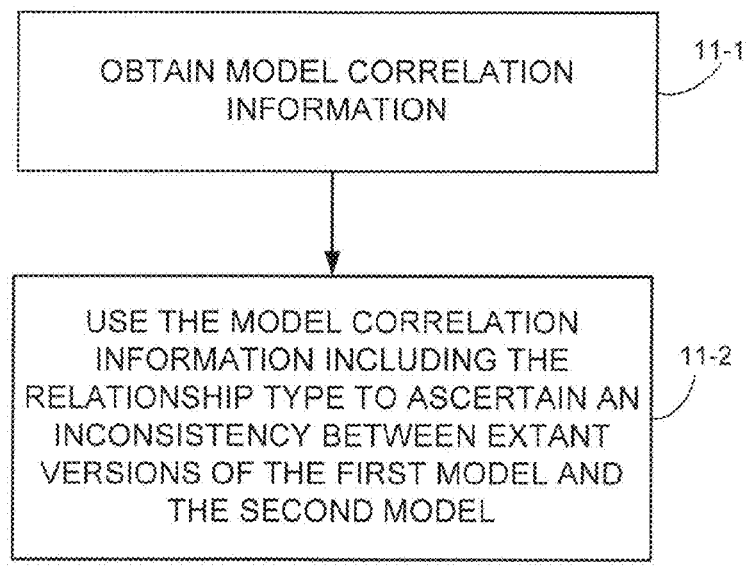
FIG. 11 is a flowchart depicting example operations included in method of executing a model consistency check procedure according to an example embodiment.

FIG. 11 shows basic, example representative operations involved in the processing section 30 executing a model consistency check procedure according to an example embodiment and mode. Operation 11-1 comprises obtaining model correlation information. The model correlation information is obtained from the database 24, and particularly to the memory section 54 (see FIG. 9) allocated for model correlation information. As explained herein, the model correlation information defines at least one relationship type between a first model and a second model and comprises a mapping of objects of the first model to objects of the second model at creation time, e.g., at time of generation of the model correlation information. An "object" of a model may include, for example, nodes, connectors, operators, etc., illustrated in a graph of the model. In at least some example embodiments, operation 11-1 involves generating the model correlation information. In other example embodiments, operation 11-1 may involve fetching or automatically obtaining the model correlation information from another source. Operation 11-2 comprises using the model correlation information including the relationship type, and when necessary the model information itself, to ascertain an inconsistency between extant versions of the first model and the second model. Various aspects of operation 11-2 are described further below. An "extant" version of a model is any version of a model for which a request is made for analysis or comparison, and thus may also be referred to as a "specified" or "compared" version of a model. While in some instances an extant version of a model may be a most recent or current version of a model, any available or accessible version of a model may be considered an "extant" version.

Regarding the model correlation information, it will be appreciated that in certain example embodiment the graph information system 20 comprises a client server architecture (e.g., server 22) and the server has a relational database system as storage system (e.g., database 24). In a system such as (for example) the ARTS system, it is possible to save the mapping information in a separate table of the server database system, e.g., in model correlation information memory section 54. For example, the mapping information (e.g., model correlation information) may be stored in a table with two columns. The first column includes the identifier of a node known as the source node and the second column includes the target node of the mapping. By storing the mapping information like described, it is possible in some instances to access the mapping information for every node by searching for the identifier of the node in the mapping table. This mapping information is the base for the consistency checks and the solution of possible inconsistencies.

The system 20 receives input to check the consistency between two computer-represented graphical models, e.g., between two graphs. For sake of simplicity, the term "model" and "graph" herein also both refer to a computer-represented graphical model. The map generator 34 of model consistency check unit 32 uses input to build the model correlation information 54, also known as the mapping table or correlation table. As shown in FIG. 9, map generator 34 comprises both relationship type assignment module 70 and object correlator 72.

Figure 5:
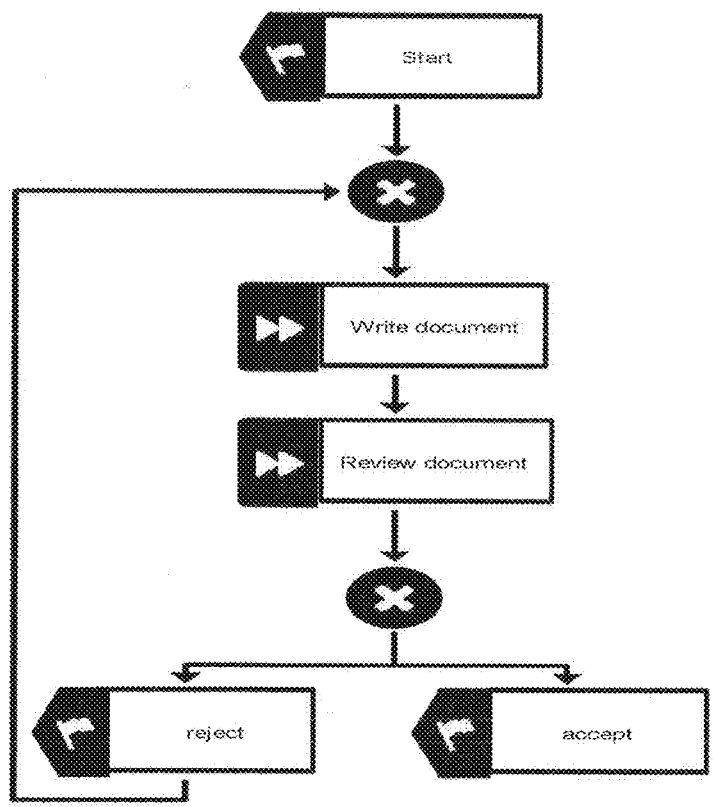
Figure 6:
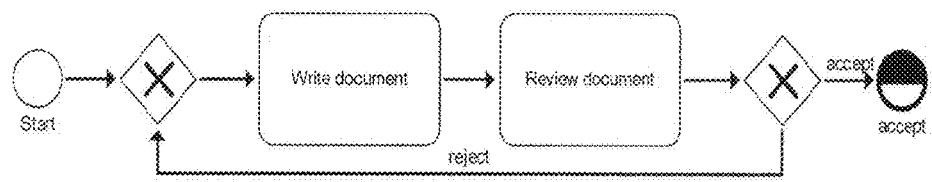
Figure 12:
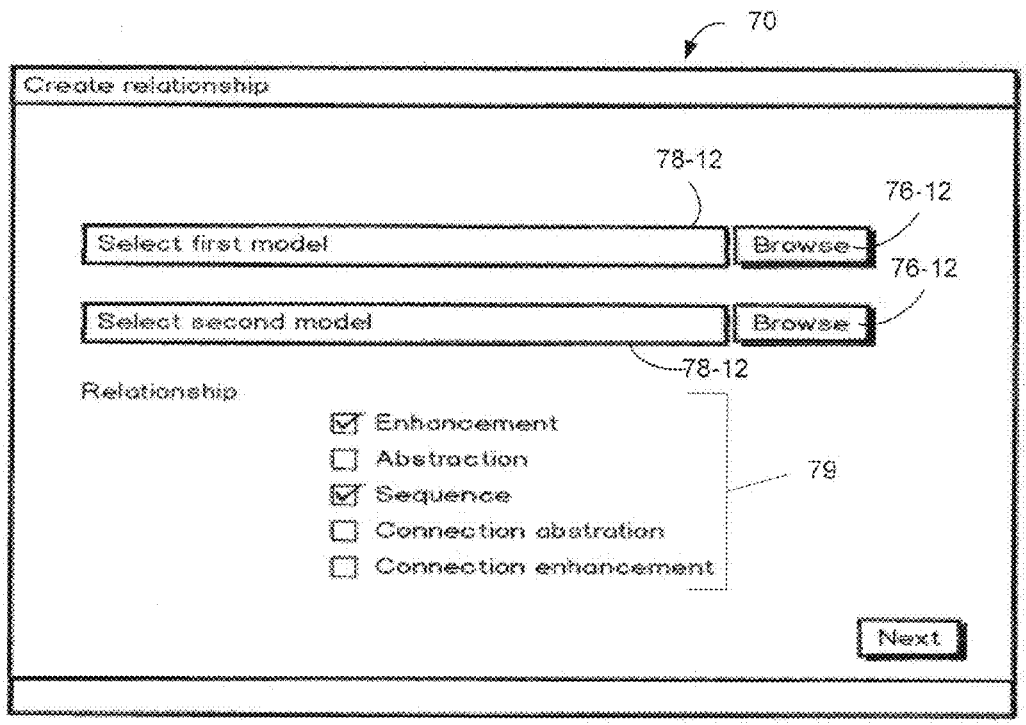
FIGS. 12-13 are diagrammatic views depicting example screens or wizards of a graphical interface through which a user/operator may input model information for generating model correlation table according to an example embodiment.

The relationship type assignment module 70 helps define the relationship between the graphs to be monitored. Each kind of relationship may involve a different set of consistency checks and a different set of operations to regain the consistency of the graphs. The relationship between the graphs can be defined by the user at client device 26, by using a graphical interface (dialog), serviced by client user interface 64, to select the relationship type from a list, etc. FIG. 12 illustrates an example "create relationship" screen 74 of such a graphical interface. In FIG. 12, browse buttons 76-12 open respective browse dialogs 78-12 to select a model from database memory section 52 of the database 24. Alternatively, the relationship can be automatically created by another action of the system. For instance, in the example of FIGS. 5-6, one process is shown in two different notations (EPC in FIG. 5 and BPMN2 in FIG. 6). If the BPMN2 graph was generated from the EPC graph by using an automated transformation, then it is possible to maintain the relationship between the two graphs automatically during the EPC to BPMN translation. Another example would be a special copy operation for a process, e.g., "create enhancement copy," that creates a copy of a process and automatically sets the enhancement relationship between the source and the target process. It thus will be appreciated that relationship mappings may be defined manually by users, automatically based on pre-programmed intelligence (e.g., where common translations like EPC to BPMN translations are involved), and/or a combination thereof (e.g., where some relationships are manually specified, others are automatically determined, still others are determined automatically and subject to manual confirmation, etc.).

Once the two graphs/models are selected, the user/operator may select one or more of the relationship types existing between the graphs. To do so, the operator/user may click or otherwise select any one of the associated input boxes 79 associated with the respective relationship types. FIG. 12 particularly shows example relationship types as being (A) an enhancement relationship; (B) an abstraction relationship; (C) a sequence relationship; (D) a connection abstraction relationship; and (E) a connection enhancement relationship. More than one input box may be selected to indicate a combination of two or more of (A)-(E).

The object correlator 72 serves to input or develop a mapping between the nodes of the graphs. The mapping is a connection, association, or correlation between a node in the first graph and a node in the second graph. Thus, the mapping forms a third bipartite graph, which in essence is the mapping table of the model correlation information, based on the nodes of the first and the second graph. In this bipartite graph, the start and the end point of a connection is located in a different graph, in the manner illustrated in FIG. 7, for example.

Figure 13:
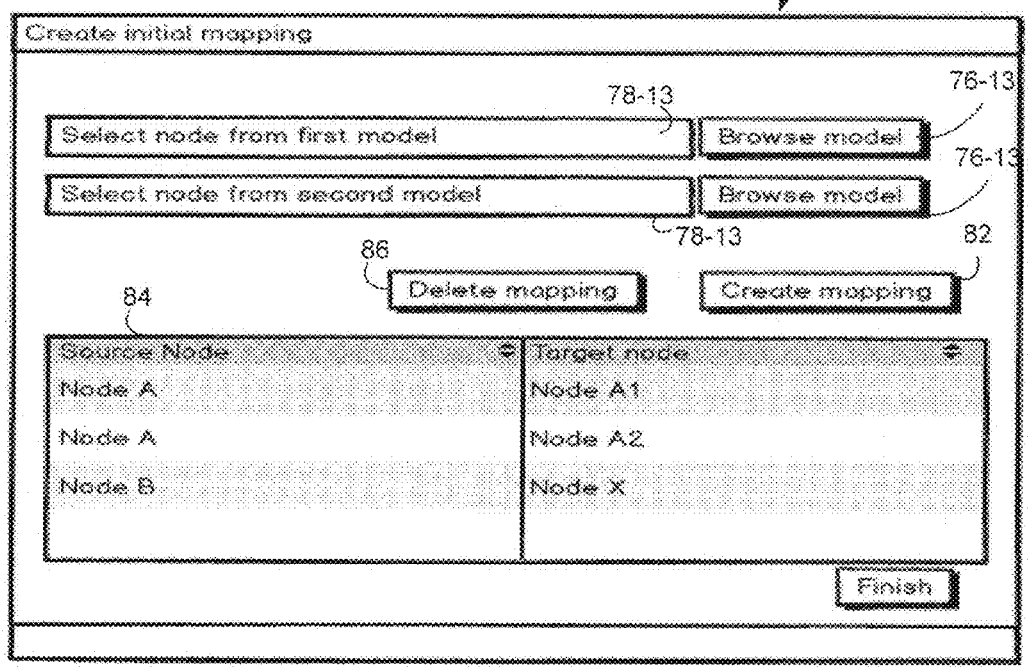

As alluded to above, the mapping of nodes may be input into object correlator 72 in several ways, including automatic, manual, and/or combinations thereof. If the mapping is automatically generated during a transformation or a copy operation, then the initial mapping can be also generated automatically. In the case of a transformation, the source nodes may be automatically mapped to the corresponding target nodes. If the relationship is generated manually, the initial mapping can be also created manually, for example, by using the illustrative wizard "create initial mapping" screen 80 shown in FIG. 13. In the wizard page illustrated in FIG. 13, for example, it is possible to select a node from the first graph and a node from the second graph (defined in the page/screen shown in FIG. 12). The "browse model" buttons 76-13 open respective dialogs 78-13 with a list of all nodes of the first/second graph. The "create mapping" button 82 will create a mapping between the selected node from the first graph and the selected node from the second graph. As the mapping is created, the mapping will be displayed in a model mapping table 84 of the wizard page 80. A "delete mapping button" 86 can be used to delete a mapping from the table of the created mappings. Upon completion of all manual mapping input, mapping table generator 88 of map generator 34 shown in FIG. 10 generates the model correlation information (also known as the mapping table and the model correlation table) for storage in model correlation information 54 of database 24. Both wizard pages 70 of FIG. 12 and 80 of FIG. 13 are sufficient to create the initial required information (e.g., a defined relationship between graphs and maintained initial mapping). If the initial mapping is not complete, the unmapped elements may create a set of conflicts. This conflict set can be resolved like a normal conflict set that occurs during a change of a model. See, for example, U.S. Publication Nos. 2013/0104099 and 2012/0210294, each of which is hereby incorporated by reference herein in its entirety.

Mention has been made above of relationship types, and the fact that the user may (e.g., using the "create initial mapping" screen 70 of FIG. 12, as previously discussed) define the graph relationship as the base for the consistency that the system should maintain. Most relationship types are directed. This implies that the relationship is not symmetric. For that reason, one of the graphs is typically referred to as source graph and the other graph is typically called target graph. However, it will be appreciated that this does not mean that changes from the target graph cannot be transferred to the source graph. Several example relationship types are below discussed in more detail.

Figure 14A:
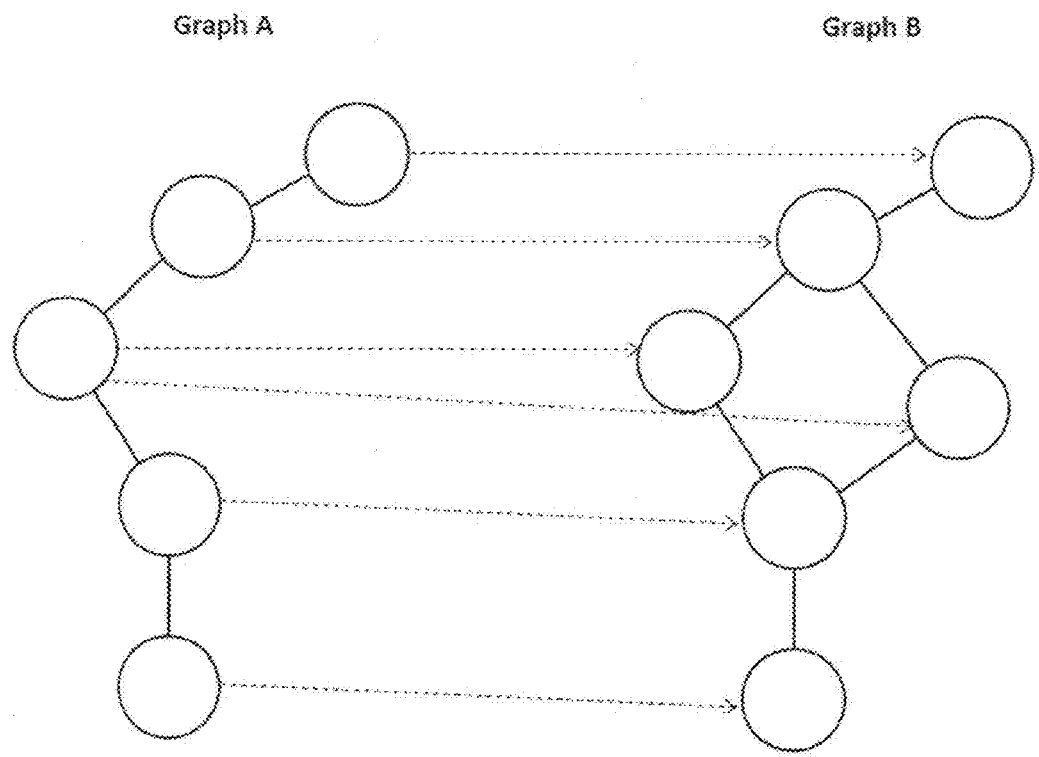
FIGS. 14A-14D are diagrammatic views that help illustrate, either by valid or invalid example, different relationship types between two graphical models.

FIG. 14A is an example of an asymmetric relationship, where every node of the source graph is be represented by one or more nodes in the target graph. FIG. 14A also shows an example of an enhancement between Graph A (source) and Graph B (target). Every node of graph A is mapped to one or more nodes in graph B. The example in FIG. 8 is also an example for an enhancement mapping because every node in the source graph is mapped to at least one node in the target graph.

FIG. 7 is an example of an abstraction relationship. An abstraction relationship is the opposite relationship to the enhancement relationship (also asymmetric). Every node in the target graph is represented by one or more nodes in the source graph. FIG. 7 shows an example of an abstraction relationship between Graph A (source) and Graph B (target). Every node in Graph B is mapped to one or more nodes in Graph A. Another and perhaps more realistic example of an abstraction relationship is shown in 14B. FIG. 14B shows an abstraction mapping between the graph "source" and the graph "target". The mapping information is visualized as dotted lines.

Figure 1:
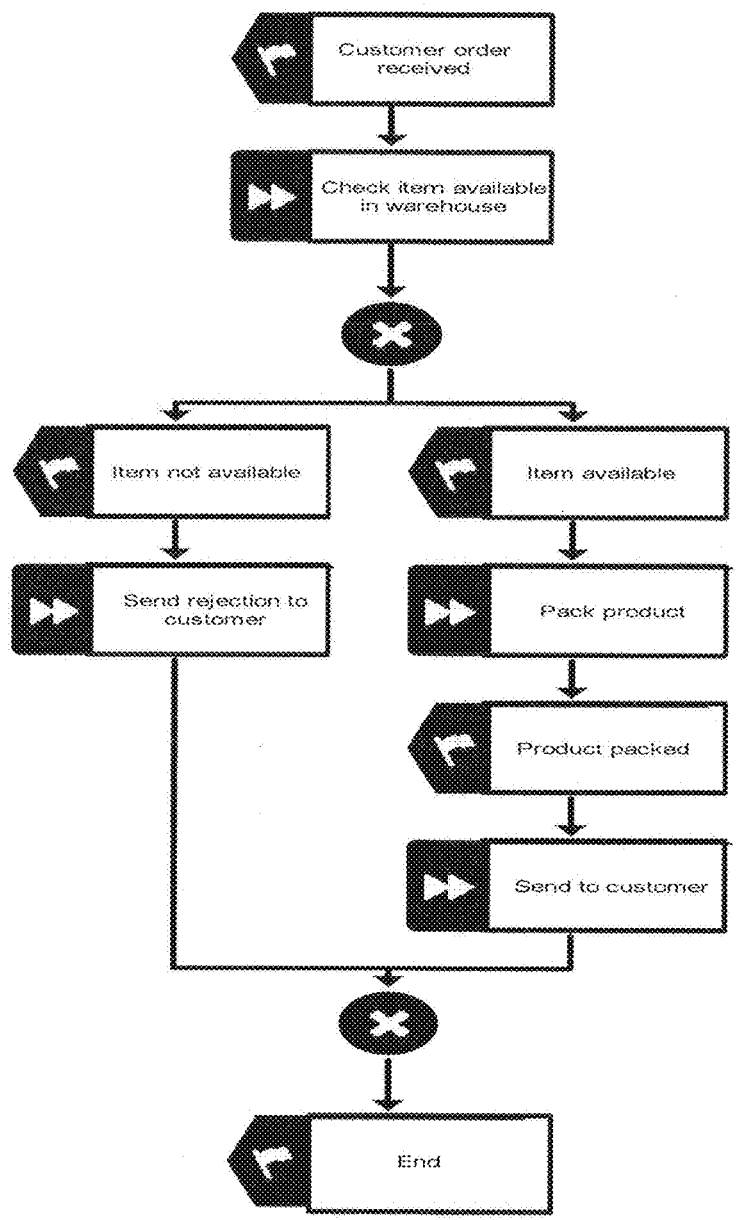
FIGS. 1-6 are diagrammatic views depicting various examples of graph relationships.
Figure 2:
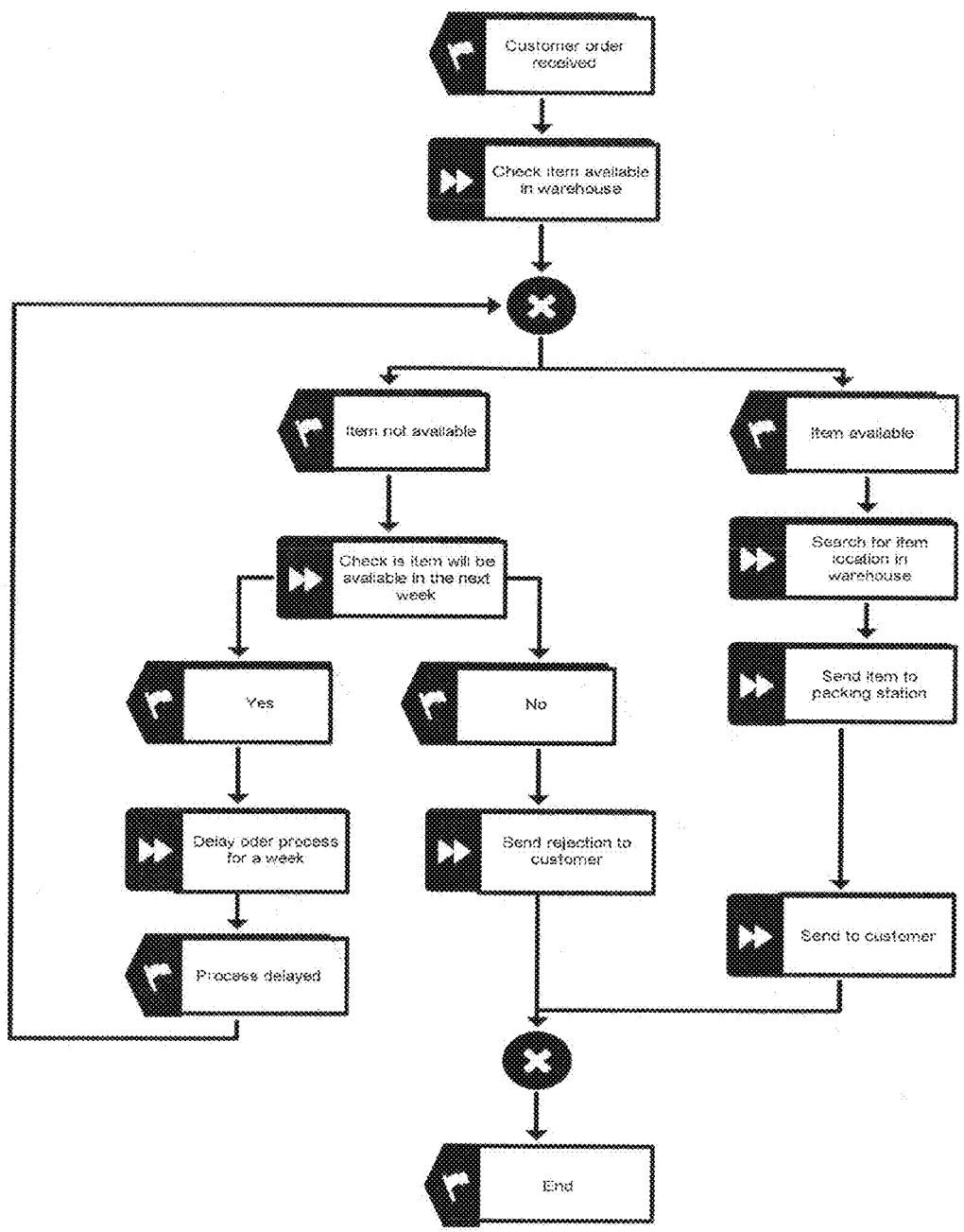
Figure 3:
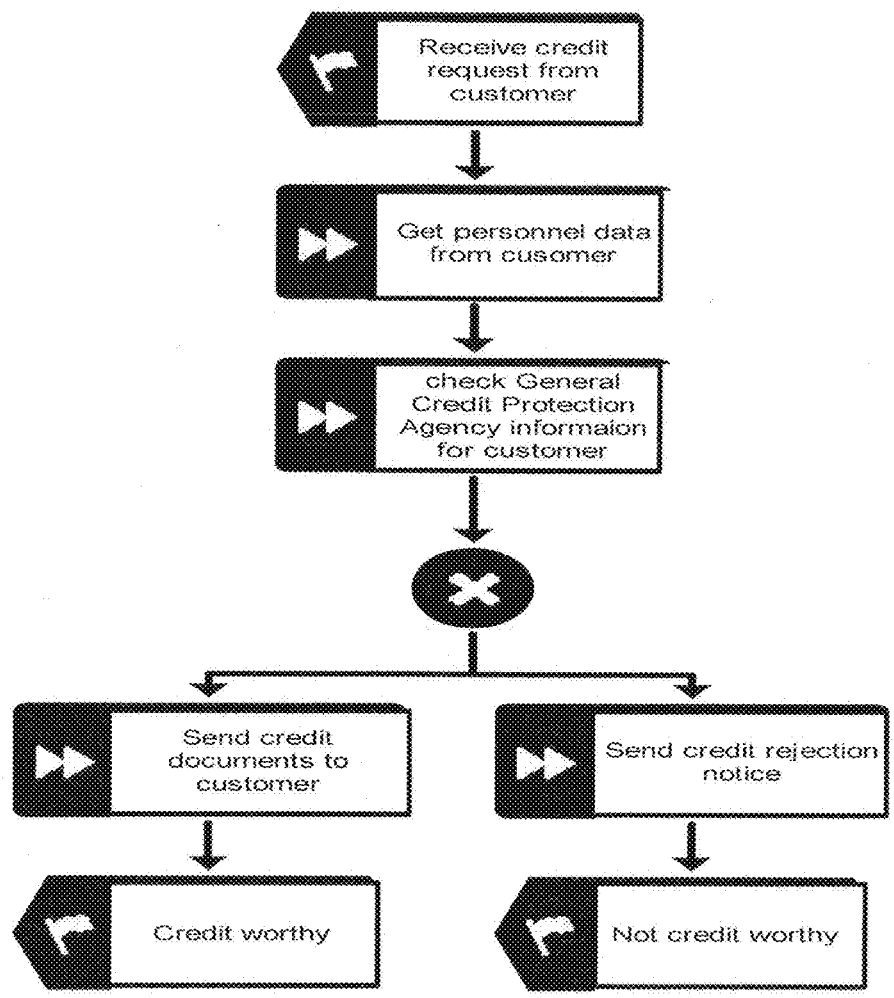
Figure 4:
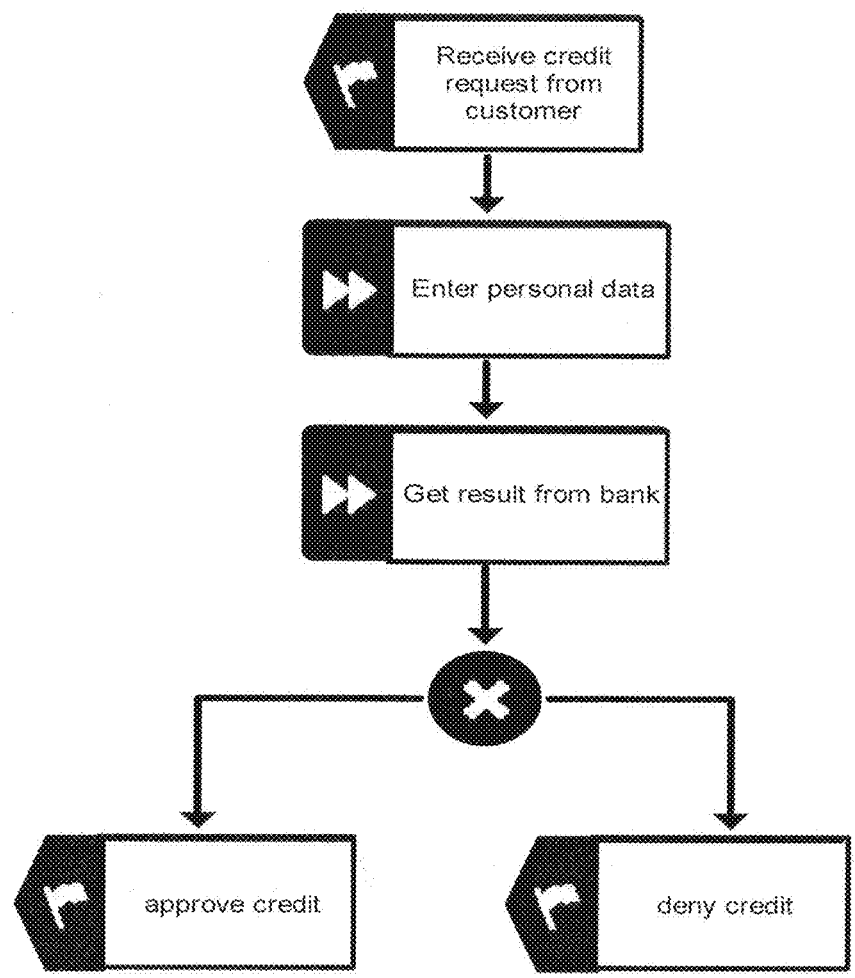
Figure 14D:
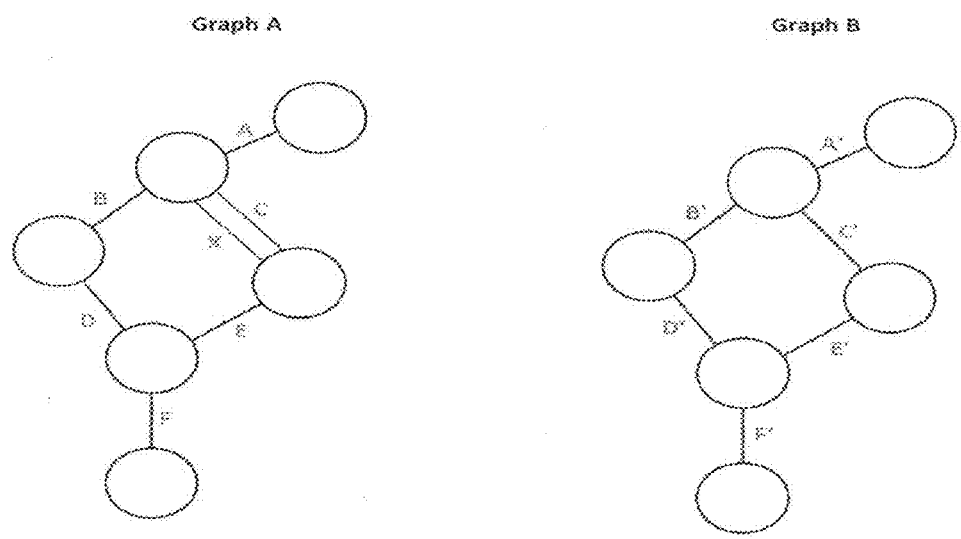
Figure 14B:
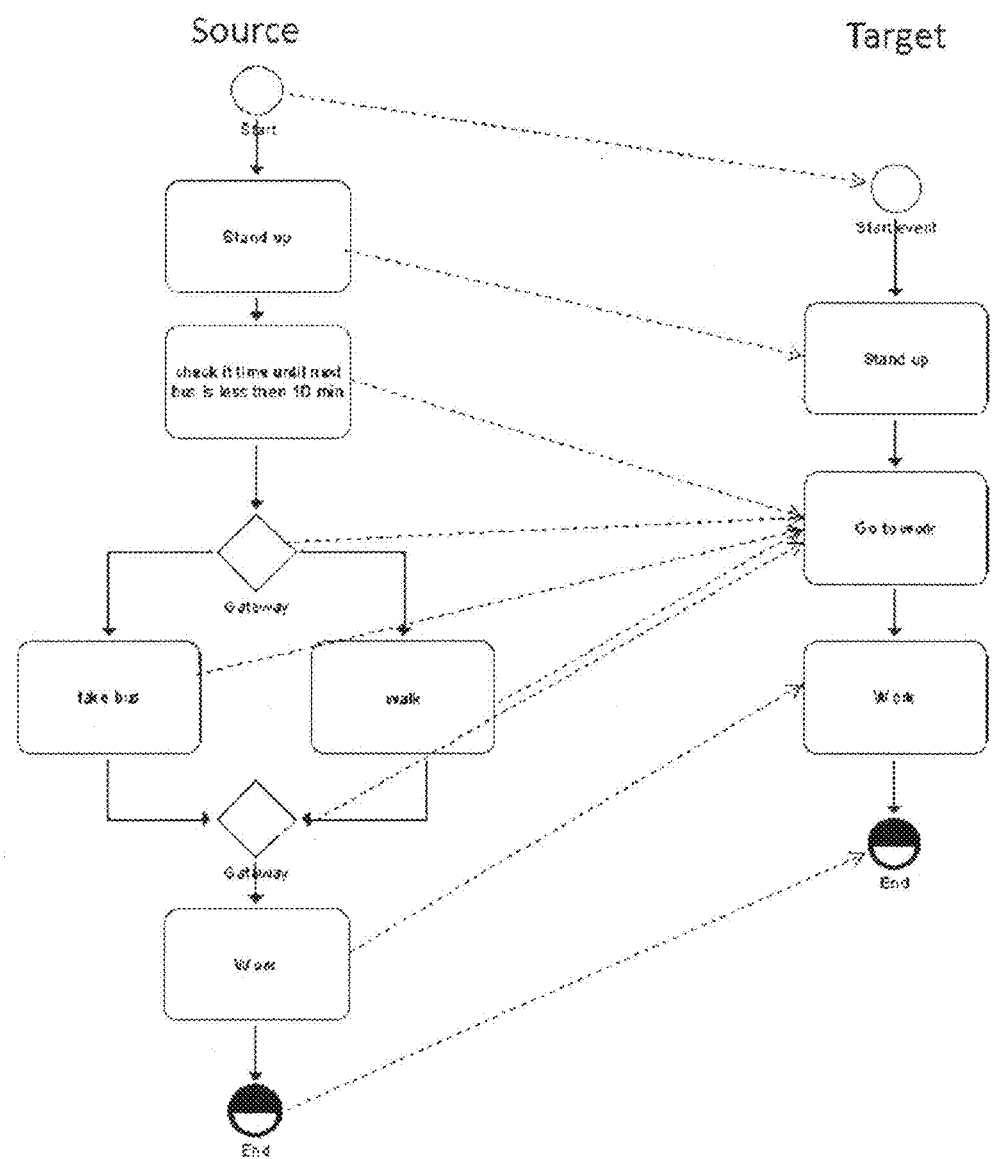
Figure 14C:
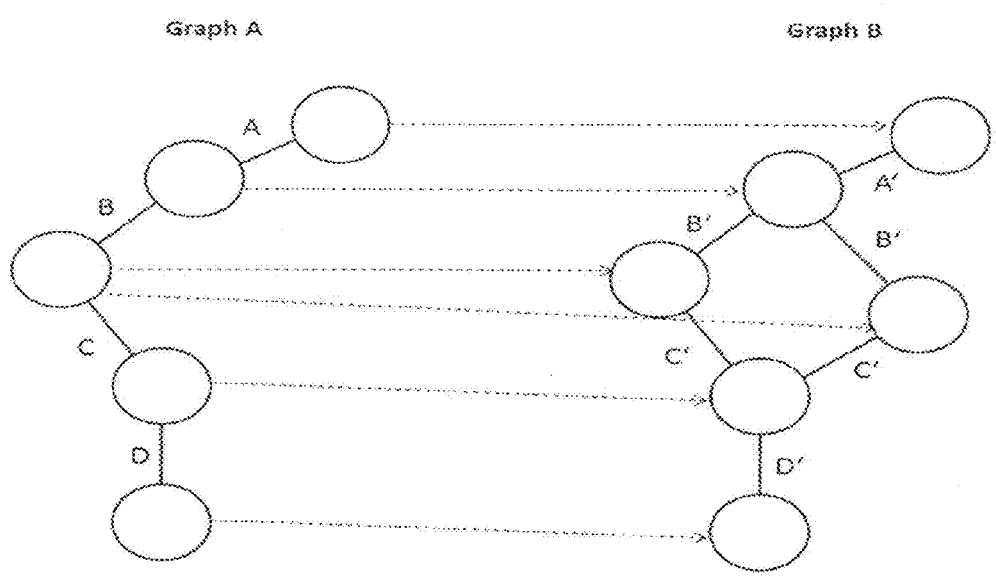
Figures 1, 14C:
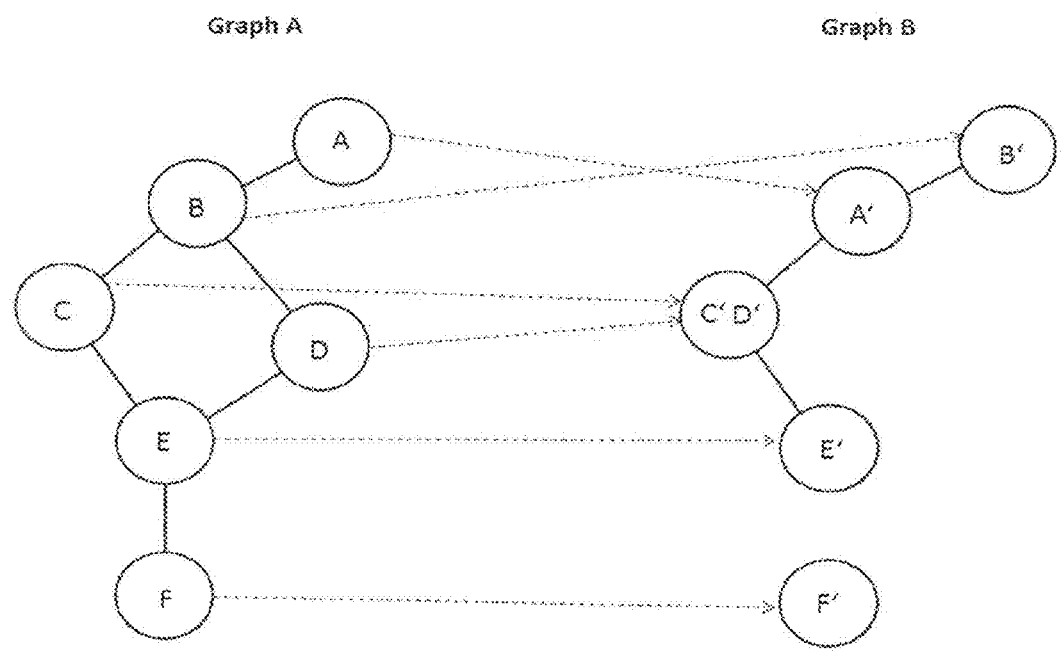
Figures 2, 14C:
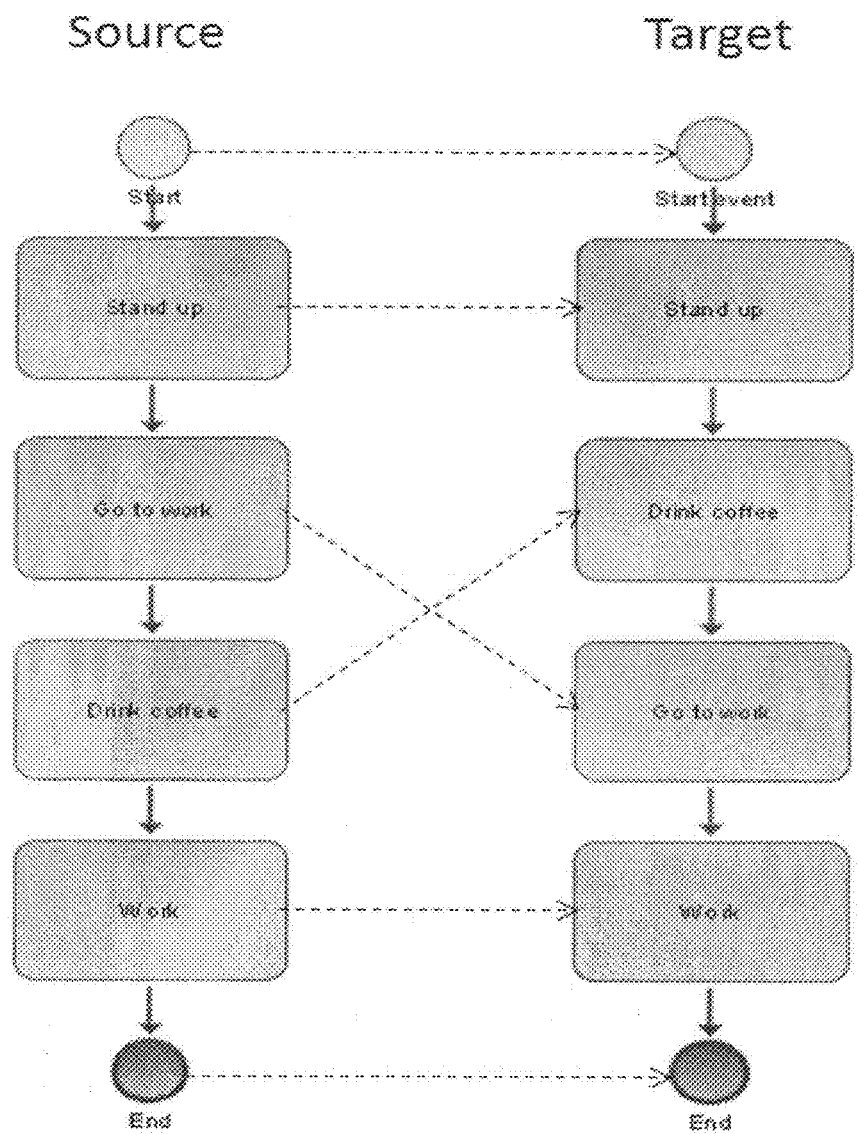

FIG. 14C is an example of a sequence relationship. A sequence relationship is a symmetric relationship, where every neighbor of a node A in the source graph is represented by a neighbor of the representation of the node A in the target graph. If the graph is a directed graph, then the direction between node A and the neighbor node in the source graph is the same as in the target graph between the representation of node A and the neighbor. FIG. 14C shows a valid sequence relationship between graph A and graph B. Every source node in the source graph A has neighbors that are mapped to the neighbors of the source node. FIG. 8 is another example for a valid sequence relationship between the source graph and the target graph. FIG. 14C-1 shows an example of a mapping between graph A and graph B which has a sequence conflict. In the current mapping, the node A is mapped to node A'. The node A' has the neighbors B' and C'D' but the node A has only the neighbor B (C and D are missing). Another example of a sequence conflict in FIG. 14C-1 is the node F has the neighbor E but the node F' has no neighbors. FIG. 14C-2 shows an example of an invalid sequence mapping for two graphs in the BPMN2 notation.

FIG. 14D shows an example connection abstraction. A connection abstraction relationship is asymmetric and can only be defined for graphs with parallel connections between two nodes. In this relationship, every connection in the target graph has a representation in the source graph. FIG. 14D shows an example for connection abstraction. Every connection in the target graph B has a representation in the source graph A, but the connection C' is represented in the source graph A with the connection C and X.

A connection enhancement relationship is, like the connection abstraction relationship, asymmetric and only valid for graphs with parallel connections. Every connection in the source graph has a representation in the target graph. Connection enhancement is the opposite relationship of the connection abstraction relationship. FIG. 14D can be seen as an example for a connection enhancement with graph B as source graph and graph A as target graph. Every connection of the source graph has at least one representation in target graph A.

The server 22 supports also other types of relationships as long as the conflict between the graphs can be calculated based on the mapping. For example, it is possible to combine the algorithms for enhancement and sequence. It would also be possible to define a relationship as a combination of enhancement and abstraction. The relationship can, for example, be fulfilled if the enhancement or the abstraction relationship is fulfilled.

Figure 10:
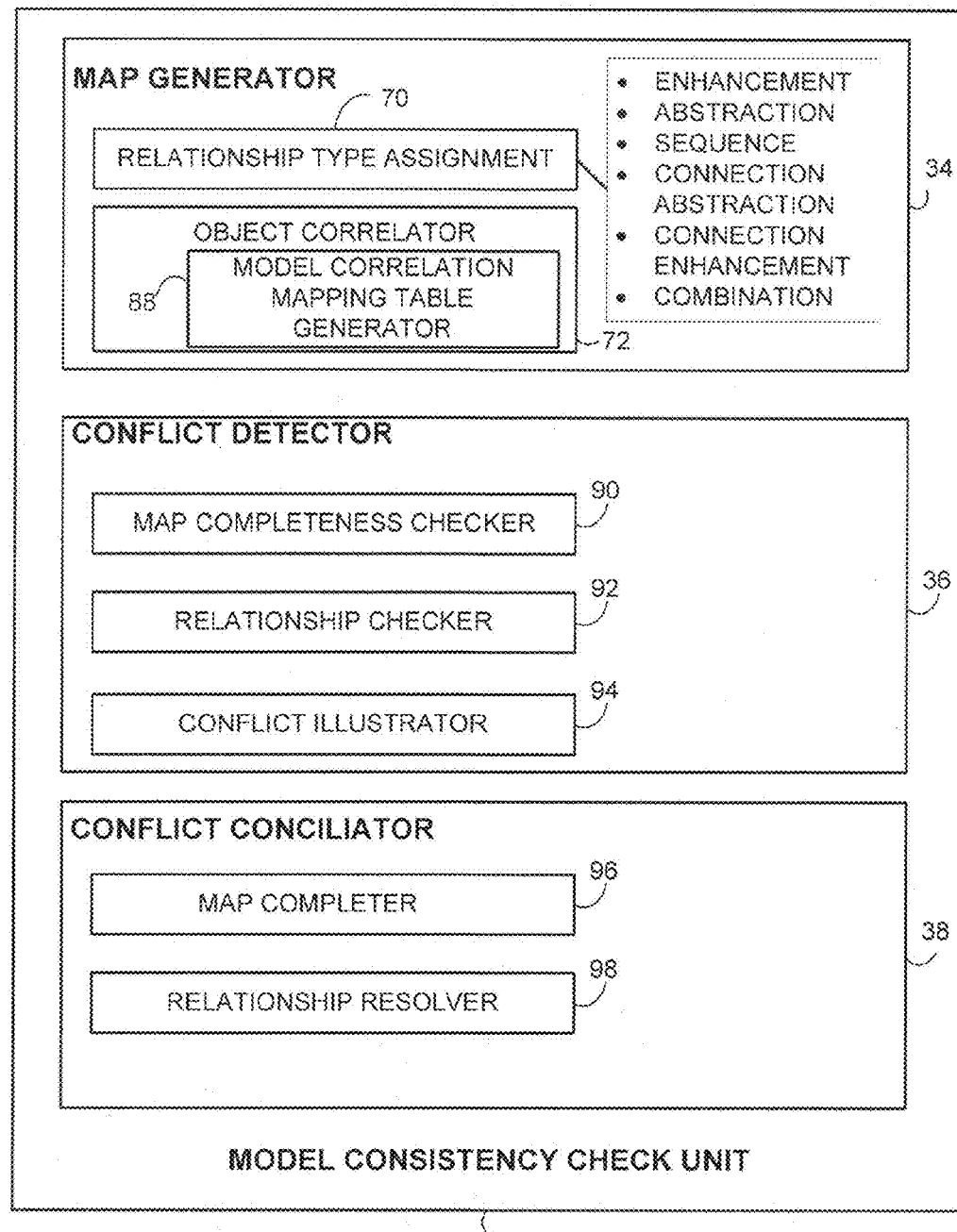
FIG. 10 is a schematic view of a model consistency check unit according to an example embodiment.

To restore the consistency between graphs, inconsistency or conflict detection may be performed. To detect the inconsistency, the conflict detector 36 may, for example, evaluate mapping information (e.g., model correlation information 54) between the graphs. By using this information, it is possible to detect the inconsistencies. The conflict detector 36 of model consistency check unit 32 is shown in FIG. 10 as comprising map completeness checker 90; relationship checker 92; and conflict illustrator 94.

Because the mapping information helps in detecting inconsistencies, it may be desirable to first detect if the mapping between the two graphs is incomplete. The map completeness checker 90 of conflict detector 36 therefore may help in detecting if the mapping between the two graphs, e.g., Graph A and Graph B, is incomplete. The mapping between the graphs can become incomplete if a node is added or removed from one of the graphs, for example. These types of changes result in a missing mapping conflict to be resolved before the relationship conflicts can be resolved. A simple reason for an inconsistency can be that one graph contains nodes that have no representation in the other graph. The reason for this inconsistency can be that the user has added nodes in one graph or that he has deleted nodes in a graph. The result for both operations is the same. In one graph are one or more nodes available that do not have a representation in the other graph. Every node without a mapping is a conflict.

The map completeness checker 90 may execute logic such as the example logic shown in Code Segment 1 ("Missing Mapping Conflict Detection") in order to return a set of nodes missing mappings. The logic of Code Segment 1 takes as input the two graphs "Graph A" and "Graph B" and returns a set of nodes which have no mapping. If the returned set is empty then no mapping conflict is present else all nodes without mapping are contained in the returned set (see line 7). To find the missing mapping the algorithm calls a procedure "Find Missing Mapping" (see line 4 and line 5). The procedure "Find Missing Mapping", having example logic shown in Code Segment 2, returns all nodes in a set which have no mapping from the first graph to the second graph. For that reason the logic of Code Segment 2 is called twice (see line 4 and line 5) to find the missing mappings in both directions (between the both calls in one difference, the parameters are switched). The result of the two procedure calls is saved in two variables "mapping_conflicts_A_to_B" and "mapping_conflicts_B_to_A". The union set of the two sets "mapping_conflicts_A_to_B" and "mapping_conflicts_B_to_A" is the set of all missing mappings (see line 6). This union set "mapping_conflicts" is returned by the logic of Code Segment 1.

Code Segment 1: Missing Mapping Conflict Detection

```
Algorithm missing mapping conflict detection
    Input: Graph A; Graph B
    Output: Set of nodes without valid mapping
    CALL "find missing mapping" WITH Graph A AND Graph B
    RETURNING mapping_conflicts_A_to_B
    CALL "find missing mapping" WITH Graph B AND Graph A
    RETURNING mapping_conflicts_B_to_A
    mapping_conflicts = mapping_conflicts_A_to_B AND
    mapping_conflicts_B_to_A
    CALL "group mapping conflicts" WITH mapping_conflicts
    RETURNING grouped_mapping_conflicts
```

The procedure "Find Missing Mapping" shown in Code Segment 2 puts all nodes from the first parameter in a set (see line 4) and all nodes of the second parameter in another set (see line 5). After that step the procedure saves all nodes from the first set (Nodes_X) in a set called "Conflicts". Then, the procedure iterates over all nodes in the first set (see line 7) and checks if the nodes have mappings that point to nodes from the second set (see line 8-10). If this is the case, then the node has a valid mapping and can be removed from the set of conflicts (see line 11). All nodes that are left in the "Conflicts" set have no valid mapping to the other graph.

Code Segment 2: Find Missing Mapping

```
Procedure find missing mapping
        Input: Graph X; Graph Y
        Output: Set of nodes without valid mapping
    Nodes_X = all nodes of Graph X
    Nodes_Y = all nodes of Graph Y
    Conflicts = Nodes_X
    FOR EACH node IN Nodes_X
        FOR EACH mapping IN node
            Target = target of mapping
            IF target IS MEMBER OF NODES_Y
                REMOVE node FROM Conflicts
    RETURN Conflicts
```

The relationship checker 92 of conflict detector 36 ascertains whether the one or more relationship types previously specified as characterizing the relationship(s) between the two models, e.g., Graph A and Graph B, is still viable for the extant version of Graph A and Graph B. Such a check may be desirable, since any changes of either graph may or may not have violated the specified relationship.

Relationship conflicts can occur if the mapping is inconsistent with the relationship defined by the user. For example, if the user has defined that for every mapping the neighbors of the nodes are also mapped, then every new neighbor can lead to an inconsistency (see, e.g., FIG. 14C-1). Examples of inconsistencies include the following:

For a refinement relationship: More than one node in the target graph is mapped to a source node (this mapping would be an abstraction relationship).

For an abstraction relationship: More than one node in the source graph is mapped to a target node (this mapping would be an refinement relationship).

For a sequence abstraction: The target graph contains more connections between to nodes than the source graph.

For a sequence refinement: The source graph contains more connections between to nodes than the target graph.

Figure 15:
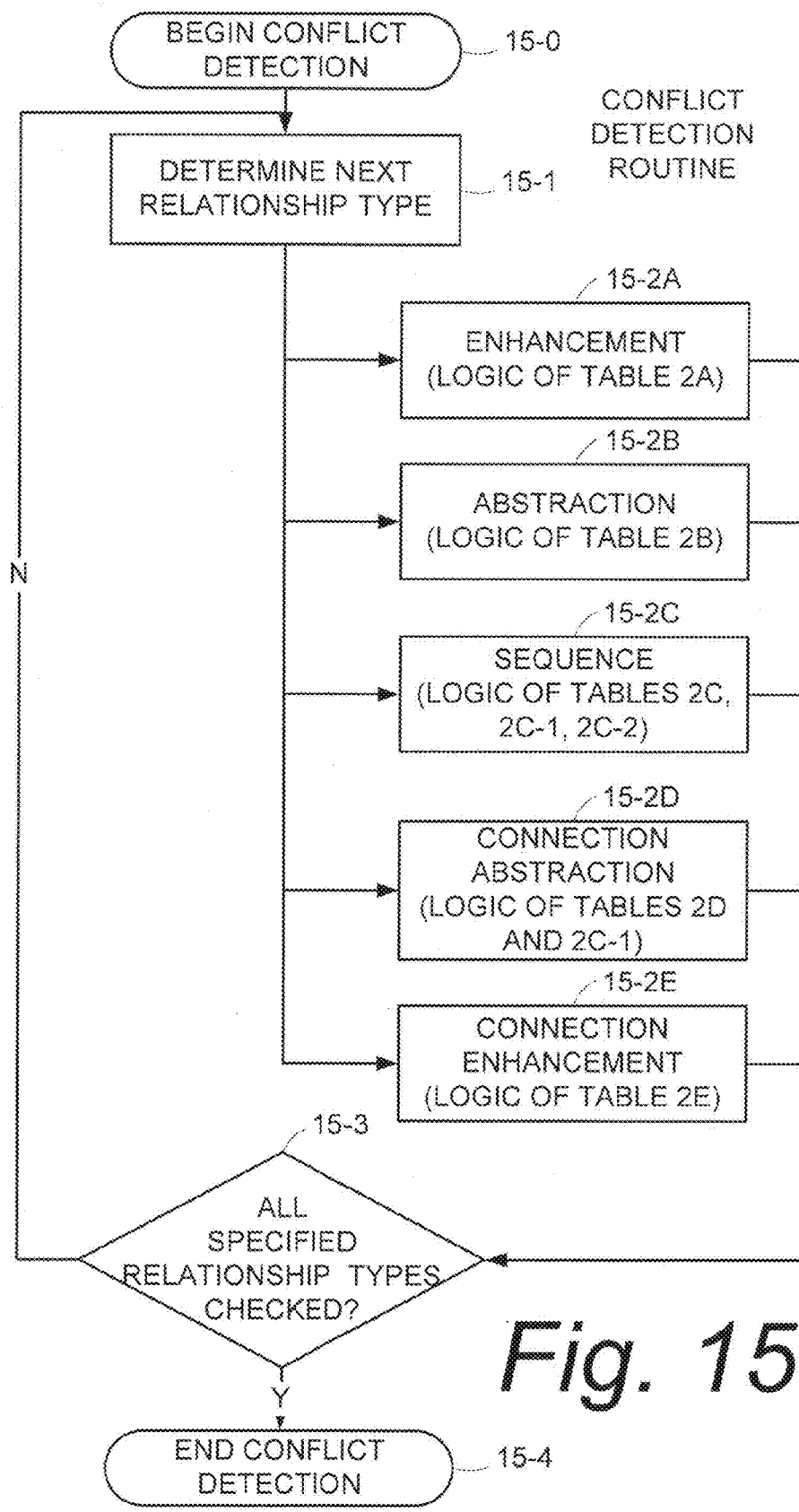
FIG. 15 is a flowchart depicting example operations included in a basic, representative graph/model relationship checking routine executed according to an example embodiment.

Example basic logic of relationship checker 92 is illustrated by the example, representative operations shown in FIG. 15. Operation 15-0 depicts the beginning of the execution of a conflict detection routine performed by relationship checker 92. Execution of the conflict detection routine may follow execution of map completeness checker 90. As operation 15-1, the relationship checker 92 determines the nature of a first specified relationship which supposedly characterizes Graph A and Graph B. The first specified relationship may be a sole specified relationship type or a first of several specified relationship types, since more than one relationship may characterize Graph A and Graph B. Depending on the relationship type determined from the model correlation information, execution by relationship checker 92 then branches to the appropriate one of operations 15-2A through 15-2E, accordingly. Each of operations 15-2A through 15-2E corresponds to a different relationship type-appropriate detection module comprising executable instructions, examples of which are provided in correspondingly suffixed Code Segment 3A-3E. Thus, the processing section 30 that embodies the relationship checker 92 in certain example implementations uses the relationship type to select an appropriate one of plural inconsistency detection logic modules to execute to ascertain the inconsistency.

If the relationship is determined at operation 15-1 to be an enhancement relationship, operation 15-2A (comprising the logic of Code Segment 3A) is performed. If the relationship is determined at operation 15-1 to be an abstraction relationship, operation 15-2B (comprising the logic of Code Segment 3B) is performed. If the relationship is determined at operation 15-1 to be a sequence relationship, operation 15-2C (comprising the logic of Code Segment 3C [and, by procedure calls, Code Segment 3C-1, Code Segment 3C-2, and Code Segment 3C-3]) is performed. If the relationship is determined at operation 15-1 to be a connection abstraction relationship, operation 15-2D (comprising the logic of Code Segment 3D) is performed. If the relationship is determined at operation 15-1 to be a connection enhancement relationship, operation 15-2E (comprising the logic of Code Segment 3E) is performed.

After each of operation 15-2A through 15-2E, inclusive, execution continues at operation 15-3, where a determination is made as to whether all relationship types specified for the input graphs (e.g., Graph A and Graph B) have been checked. If another relationship type is to be checked, execution loops back to operation 15-1. Otherwise, the relationship checker 92 ends its execution as reflected by operation 15-4.

As mentioned above, the conflict detection routine performed by relationship checker 92 refers to various different relationship type-appropriate detection modules comprising executable instructions, examples of which are provided in correspondingly suffixed Code Segment 3A-3E. More detailed discussion of each relationship type-appropriate detection module and its corresponding logic segment is provided below.

Enhancement Confliction Detection: The pseudo-code in Code Segment 3A shows example logic that detects enhancement conflicts. The algorithm takes as input two graphs A and B. The algorithm checks if Graph B is an enhancement of Graph A. If the relationship is broken for some nodes, then the algorithm returns all nodes causing a conflict in a set called "Conflicts". The algorithm iterates over every node in graph B (see line 7). For every node in Graph B, a check is made as to whether a mapping exist that is targeting to Graph A (see line 11). If one mapping is found, then the variable "one_mapping_found" is set to "true" (see line 12). If a second mapping is found, then one node in graph B is mapped to more than one node in graph A. In certain example embodiments, this is not allowed in an enhancement relationship from graph A to graph B. For that reason, the node is added to the set "Conflicts" (see line 13). If the "Conflicts" set it empty if the algorithm terminates, then graph B is an enhancement of graph A; otherwise, the set contain all nodes that caused a conflict in the enhancement relationship between graph A and graph B.

Code Segment 3A: Enhancement Conflict Detection Logic

```
Procedure find enhancement conflicts
    Input: Graph A; Graph B
    Output: Set of conflicts
Nodes_A = all nodes of Graph A
Nodes_B = all nodes of Graph B
Conflicts = { }
FOR EACH node IN Nodes_B
    one_mapping_found = false
    FOR EACH mapping IN node
        source = source OF mapping
    IF source IS MEMBER OF NODES_A
        IF one_mapping_found
            Conflicts ADD node
        ELSE
            one_mapping_found = true
RETURN Conflicts
```

Abstraction Confliction Detection: The example logic of Code Segment 3B finds the conflicts for an abstraction relationship between Graph A and Graph B (Graph B is an abstraction of Graph A). The algorithm takes both graphs as input and returns the set of conflict nodes (see line 16). If the set of conflicts is empty, then Graph B is an abstraction of Graph A; otherwise all nodes that are causing a conflict are returned by the algorithm. To calculate the conflicts the algorithm iterates over all nodes in Graph A (see line 7) and checks if the node contains more than one mapping to a node in Graph B. If one mapping is found for a node, then the variable "one_mapping_found" is set to true. If a second mapping is found, the node is added to the conflict set.

Code Segment 3B: Abstraction Conflict Detection Logic

```
Procedure find enhancement conflicts
    Input: Graph A; Graph B
    Output: Set of conflicts
Nodes_A = all nodes of Graph A
Nodes_B = all nodes of Graph B
Conflicts = { }
FOR EACH node IN Nodes_B
    one_mapping_found = false
    FOR EACH mapping IN node
        source = source OF mapping
```

```
            IF source IS MEMBER OF NODES_A
                IF one_mapping_found
                    Conflicts ADD node
                ELSE
                    one_mapping_found = true
    RETURN Conflicts
```

Sequence Confliction Detection: The example logic of Code Segment 3C can be used to find conflicts in a sequence relationship between two graphs. The algorithm takes as input Graph A and Graph B. The algorithm checks if the sequence relationship is consistent between Graph A and Graph B. In the case that the relationship is consistent, the algorithm returns an empty set. If the relationship is not consistent, the algorithm returns all nodes causing a conflict in a set (see line 29). To do this, the algorithm iterates over all nodes from graph A (see line 8). For every node in Graph A, the algorithm calls the procedure "find neighbors", and an example of the procedure is shown in Code Segment 3C-1. This "find neighbors" procedure returns all neighbors of the selected node. The set of neighbors is saved in the variable "source_neighbors" (see line 8). After that step, the algorithm calls the procedure "find mapping targets" (see line 10). The procedure finds all mapping targets for the node from Graph A in graph B. Example logic of a procedure "find mapping targets" is shown in Code Segment 3C-2. The set of mapping targets is saved in the variable "targets_of_node" (see line 10). In line 13, the algorithm iterates over all target nodes of mapping from the initial node "node". In the lines from 14-16, the algorithm checks whether the neighbors of the mapping targets are "real" neighbors, or whether the neighbors are also mapped to the node "node". All real neighbors are added to the set "Neighbors". In the lines from 17 to 22, the algorithm checks if the real neighbors have mappings to nodes in Graph A that are neighbors of the initial node "node". If this is not the case, then the nodes are added as conflicts to the set "Conflicts". In the lines from 23 to 28, the opposite direction is checked. In this section, the algorithm checks if the neighbors of the source node "node" have mapping in Graph B. If this is the case, the mapping targets in Graph B are neighbors of the mapping targets of the node "node". If this is to the case the target nodes are added to the set of conflict nodes (see line 28). In the lines 29-36, the algorithm checks if the mapping targets of the current node "node" are in the target graph connected to one group. This means that connections exist between the mapping targets so that it is possible to navigate from one target node to any other target node without using a connection to a node that is not a target node of the current node "node". If this is not the case, then a sequence conflict is detected and the conflict causing node is added to the conflict set (see line 36). To detect the group of mappings, the algorithm calls the procedure "find mapping group" in line 32. Example logic of recursive procedure "find mapping group" is shown in Code Segment 3C-3. The procedure "find mapping group" returns the mapping group for one mapping target. If mapping targets are available that do not belong to the group, then a conflict is detected. If the algorithm finishes, the set "Conflicts" contains all nodes that are causing sequence conflicts. If the set is empty, Graph A and Graph B have a conflict free sequence relationship.

Code Segment 3C: Sequence Conflict Detection Logic

```
Procedure find sequence conflicts
    Input: Graph A; Graph B
    Output: Set of conflicts
Nodes_A = all nodes of Graph A
Nodes_B = all nodes of Graph B
Conflicts = { }
FOR EACH node IN Nodes_A
    CALL "find neighbors" WITH node RETURNING
        source_neighbors
    CALL "find mapping targets" WITH node RETURNING
        targets_of_node
    Neighbors = { }
    FOR EACH target_node IN targets_of_node
        FOR EACH neighbor OF target_node
            IF neighbor NOT MEMBER OF Target
                Neighbors ADD neighbor
    FOR EACH neighbor IN Neighbors
        FOR EACH mapping IN neighbor
            source = source OF mapping
            IF source MEMBER OF Nodes_A
                IF source NOT MEMBER OF source_neighbors
                    Conflicts ADD source
        FOR EACH neighbor IN source_neighbors
            FOR EACH mapping IN neighbor
                target = target OF mapping
                IF target MEMBER OF Nodes_B
                    IF target NOT MEMBER OF Neighbors AND
target NOT MEMBER OF targets_of_node
                        Conflicts ADD target
    first_target = select first mapping target of node
    mapping_group = { }
    mapping_group ADD first_target
    CALL "find mapping group" WITH first_target, node,
        mapping_group
    RETURNING mapping_group
    FOR EACH mapping IN node
        target = target OF mapping
        IF target NOT MEMBER OF mapping_group
            Conflicts ADD target
```

Code Segment 3C-1: Find Neighbors

```
Procedure find neighbors
    Input: node
    Output: Set with neighbors of node
Neighbors = { }
FOR EACH neighbor OF node
    Neighbors ADD neighbor
RETURN Neighbors
Code Segment 3C-2: Find Mapping Targets
Procedure find mapping targets
    Input: node; Graph X
    Output: Set with mapping targets of node in Graph X
Targets = { }
Nodes_X = all noded of Graph X
FOR EACH mapping IN node
    IF neighbor NOT MEMBER OF Nodes_X
        Targets ADD neighbor
RETURN Targets
```

Code Segment 3C-3: Find Mapping Group

```
Procedure find mapping group
    Input: mapping_target , source_node , set_of_target_mappings
    Output: Set nodes of target graph that are: targets of source_node and
which are connected in the traget graph
CALL "find group of mapping neighbors" WITH mapping_target
RETURNING
mapping_target_neighbors
FOR EACH neighbor OF mapping_target_neighbors
    IF neighbor NOT MEMBER OF set_of_target_mappings
        FOR EACH mapping IN neighbor
            source = source OF mapping
```

```
IF source EQUALS source_node
        mapping_target_neighbors ADD neighbor
        CALL "find mapping group" WITH
            neighbor, source_node,
set_of_target_mappings RETURNING set_of_target_mappings
RETURN mapping_target_neighbors
```

Connection Abstraction Confliction Detection: The example logic of Code Segment 3D detects conflicts in the connection abstraction relationship between Graph A and Graph B, and it returns all conflict in a set of tuples. One tuple contains of the both involved nodes for the connection (or connection set) which is causing the connection abstraction conflict. The algorithm takes as input Graph A and Graph B. The algorithm checks, for every connection in Graph B, if it has at least one representation in Graph A. To check the connection abstraction relationship, the algorithm iterates over all nodes in Graph B (see line 7) and calls the "find neighbors" procedure from Code Segment 3C-1 to find all neighbors of the node "node" and save the neighbors in the set target_ neighbors (see line 8). In the next line, the algorithm iterates over all neighbors of the selected node "node" and counts the number of connections between the two nodes from Graph B. The result of this operation is saved in the variable connection_number_target_graph. After that, the algorithm iterates over the corresponding nodes in the source Graph A and counts the connection between the mapped nodes in Graph A (line 10 to 14). The result of this operation is saved in the variable connection_number_source_graph. In the next steps, the algorithm checks if the number of connection in the source graph is less than in the target graph (see line 15). If this is the case, Graph B is no valid connection abstraction of Graph A (at least one connection is in Graph B has no representation in Graph A). For that reason, the two nodes of Graph B are added to conflict tuple (see line 16). If the algorithm returns an empty set, then Graph B is a connection abstraction of Graph A else the returned set contains the conflicts for the connection abstraction relationship.

Code Segment 3D: Connection Abstraction Conflict Detection Logic

```
Procedure find connection abstraction conflicts
    Input: Graph A; Graph B
    Output: Set of conflicts
Nodes_A = all nodes of Graph A
Nodes_B = all nodes of Graph B
Conflicts = { }
FOR EACH node IN Nodes_B
    CALL "find neighbors" WITH node RETURNING target_neighbors
    FOR EACH target_neighbor IN target_neighbors
        connection_number_target_graph = count connections between
node AND target_neighbor
        FOR EACH MAPPING mapping IN node
            source = source OF mapping
            FOR EACH MAPPING mapping_neighbor IN
            target_neighbor
                connection_number_source_graph = count
connections between source AND mapping_neighbor
                IF connection_number_source_graph <
connection_number_target_graph
                        Conflicts ADD TUPLE (node , target_neighbor)
RETURN Conflicts
```

Connection Enhancement Confliction Detection: Example logic of Code Segment 3E comprises an algorithm to detect abstraction conflicts between two graphs. The algorithm takes two parameters, Graph A and Graph B. The algorithm checks if Graph B is a connection enhancement of Graph A. The algorithm iterates over all nodes of Graph A (see line 7) and calls the procedure "find neighbors" to find all neighbors of the current node "node" (see line 8). In the next line, the algorithm counts the connections between the node "node" and the current neighbor and saves the result in the variable "connection_number_source_graph". In line 14, the algorithm counts the number of connections in the target Graph B. The result of this operation is saved in variable "connection_number_target_graph". If the value in the variable "connection_number_source_graph" is grater than the value of the variable "connection_number_target_graph", a conflict detected, because not every connection in Graph A has a representation in Graph B. For that reason, the corresponding nodes in source Graph A are added as a conflict (see line 16). The algorithm returns in this case an empty set. If Graph B is a connection enhancement of Graph A, it returns a set of tuples with the nodes that are causing the conflict.

Code Segment 3E: Connection Abstraction Conflict Detection Logic

```
Procedure find connection enhancement conflicts
    Input: Graph A; Graph B
    Output: Set of conflicts
Nodes_A = all nodes of Graph A
Nodes_B = all nodes of Graph B
Conflicts = { }
FOR EACH node IN Nodes_A
    CALL "find neighbors" WITH node RETURNING
    source_neighbors
    FOR EACH source_neighbor IN source_neighbors
        connection_number_source_graph = count connections
between node AND source_neighbor
        FOR EACH MAPPING mapping IN node
            target = target OF mapping
            FOR EACH MAPPING mapping_neighbor IN
            target_neighbor
                connection_number_target_graph = count
connections between target AND mapping_neighbor
                IF connection_number_source_graph >
connection_number_target_graph
                        Conflicts ADD TUPLE (node , source_neighbor)
RETURN Conflicts
```

Upon completion of the conflict detection routine performed by relationship checker 92, such as that of FIG. 15, in certain example embodiments, the conflict illustrator 94 may be invoked. The conflict illustrator 94 serves to provide to the user/operator a visually perceptible output of the nature of the conflicts/inconsistency(ies) between the input graphical models, e.g., between Graph A and Graph B. The conflict illustrator 94 thus may provide to client device 26 data appropriately formatted for expressing the existence and nature of the inconsistency(ies). The client application program stored in client application program memory 66 is configured to receive, process, and arrange for display of the data received from the conflict illustrator 94 of model consistency check unit 32 so that an appropriate visual output depicting the inconsistency(ies) may be displayed on an appropriate visual output device, e.g., a display panel such as an LCD or LED display, for example.

In certain example embodiments, notification of the detected inconsistency(ies) between the input graphical models may be sufficient for the user/operator's purposes. In such embodiments, the user/operator may have other ways of rectifying one or more inconsistencies detected by conflict detector 36, whether such inconsistency reflects a missing node or incomplete mapping as detected by map completeness checker 90, or a relationship inconsistency as detected by relationship checker 92. As explained above, any missing node or incomplete mapping as detected by map completeness checker 90 may be resolved before performance of the relationship checking routine of relationship checker 92.

In an optional but preferred enhanced embodiment, the model consistency check unit 32 includes conflict conciliator 38. As shown in FIG. 10, conflict conciliator 38 comprises map completer 96 and relationship resolver 98.

In conjunction with conflict conciliation, both graphs (Graph A and Graph B) can be changed so the changes cannot be simply transferred automatically from one graph to the other. Because the mapping between the graphs is involved in detecting relationship conflicts, the mapping may in some cases need to be complete before the relationship conflicts can be detected. For that reason, the conflict resolution may start with the map completer 96 resolving any mapping conflicts. If all mapping conflicts are solved, the relation conflicts are detected/calculated by relationship checker 92. Based on the detected conflict, a set of possible options will be offered to the user via relationship resolver 98. For every conflict type, different solutions may be offered, as different conflict types result from different relationship types.

The map completer 96 offers to the user/operator the option to create a mapping when incompleteness (e.g., a missing node) is detected. The target for the mapping will be proposed by the system to be compatible to the relationship between the graphs. For example, if an enhancement relationship is defined, then only nodes are available as possible targets that are compatible with the enhancement relationship. Alternatively, the map completer 96 may provide the user/operator with an option of deleting any node found to be without proper mapping.

The actions performed by relationship resolver 98 depend on the particular relationship type for which conflict/inconsistency was detected:

For an enhancement incompatibility, for example, in a certain example embodiment the relationship resolver 98 may either (1) delete the incompatible mapping (which can in some cases lead to a new missing mapping incompatibility); (2) delete a node in source graph; or (3) delete a node in target graph.

For a sequence incompatibility, in a certain example embodiment the relationship resolver 98 may either (1) delete the connection that leads to the incompatibility, or (2) add a mapping to fix the relationship.

For an abstraction incompatibility, in a certain example embodiment the relationship resolver 98 may either (1) delete the incompatible mapping (can lead to a new missing mapping incompatibility), or (2) delete the node in source graph.

For a connection abstraction incompatibility, in a certain example embodiment the relationship resolver 98 may either (1) add an additional connection in source graph, or (2) delete a connection in target graph.

For a connection enhancement incompatibility, in a certain example embodiment the relationship resolver 98 may either (1) add additional connection in target graph, or (2) delete a connection in source graph.

As mentioned above, it is possible to define additional relationship types (e.g., types that are only relevant between some notations or only in special use cases), and for those user defined relationship types it may not be possible to define a generic solution. If a new relationship type is defined, then the inconsistency solver may be adapted or configured to provide solutions for the inconsistencies that can occur for the relationship.

Thus the operator/user of client device 26 is supplied with conflict resolution options by relationship resolver 98. If the user has chosen a solution for a conflict the solution is applied to the graphs. The solutions may be provided to the user of the system in of a dialog where the user can choose his preferred solution or the user can edit the mapping information manually to resolve a conflict. Depending on the solution it is possible that new conflicts appear. For that reason the conflicts may preferably be recalculated after every execution of a solution. In other words, after implementation of a solution or conciliation action the model consistency check procedure should again be executed to assure that any resolution did not inadvertently introduce any new inconsistency. Such precautionary re-execution of model consistency check procedure may be automatically invoked upon closure of relationship resolver 98.

Figure 16:
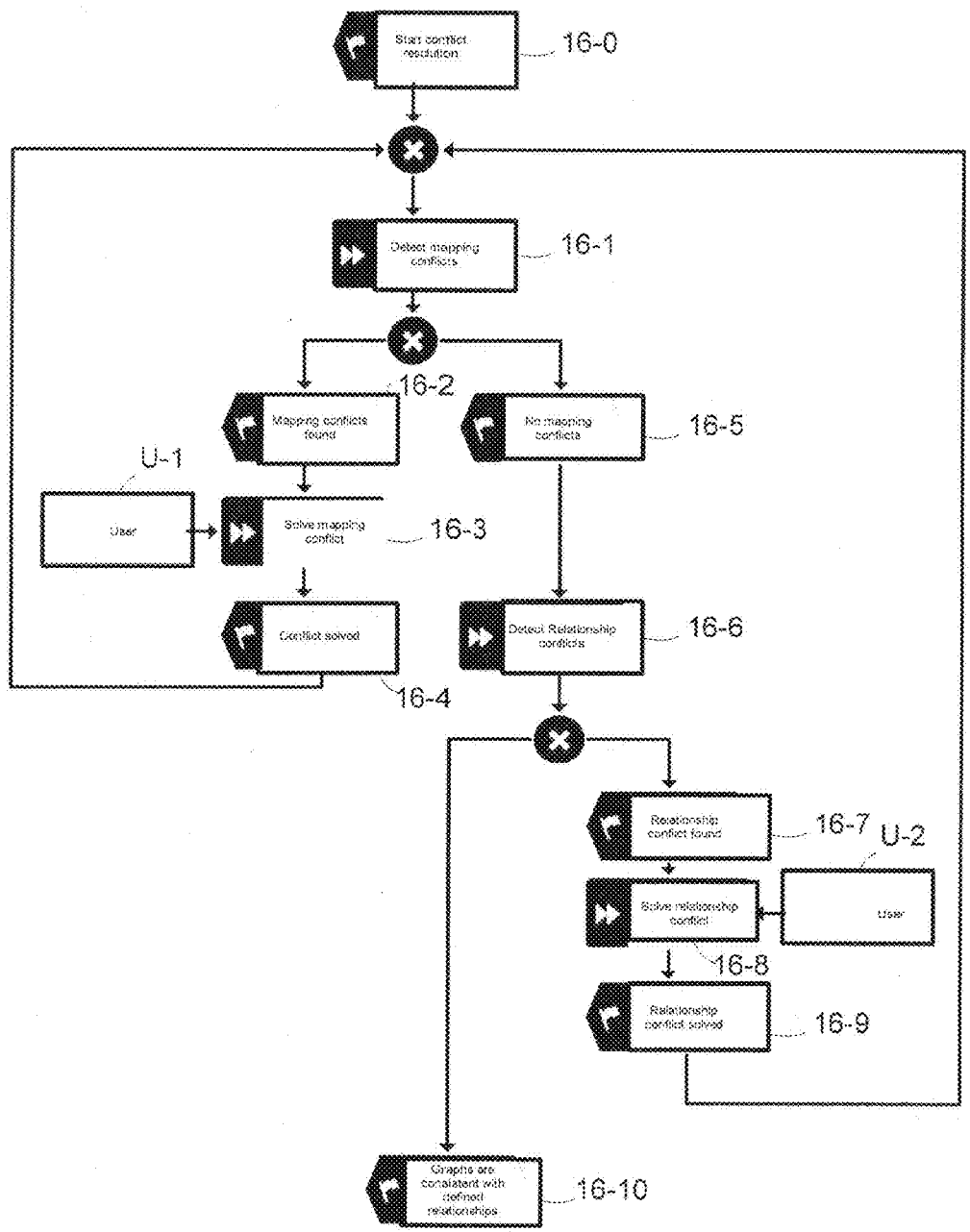
FIG. 16 is a flowchart depicting example operations included in a basic overall model consistency check procedure according to an example embodiment.

Example operations illustrating the overall functionality of model consistency check unit 32 and the model consistency check procedure are illustrated in FIG. 16, which may be referred to as a control flow for conflict resolution. Operation 16-0 depicts initiation of the model consistency check procedure as executed by model consistency check unit 32. Operations 16-1 and 16-2 depict functionality of map completeness checker 90, with operation 16-1 comprising detection of a mapping incompleteness and operation 16-2 depicting return of information reporting the mapping incompleteness. Operation 16-3 (solving mapping conflict) and operation 16-4 depict functionality of map completer 96, in conjunction with user input from client device 26 as depicted by operation U-1. Upon healing or conciliation of the two graphs, execution returns to operation 16-1 to determine if the resolution resulted in any other map incompleteness issues. Should no mapping incompleteness be detected (as reflected by operation 16-5), execution of the relationship checker 92 is initiated as depicted by operation 16-6. If a relationship conflict is detected (operation 16-7), execution of relationship resolver 98 is invoked as depicted by operation 16-8 and operation 16-9, in conjunction with user input from client device 26 as depicted by operation U-2. Upon rectification or resolution of the relationship conflict, execution returns to operation 16-1 to determine if the resolution resulted in any other relationship conflicts/inconsistency. When all conflicts/inconsistencies are resolved, the model consistency check procedure terminates as reflected by operation 16-10.

Figure 17:
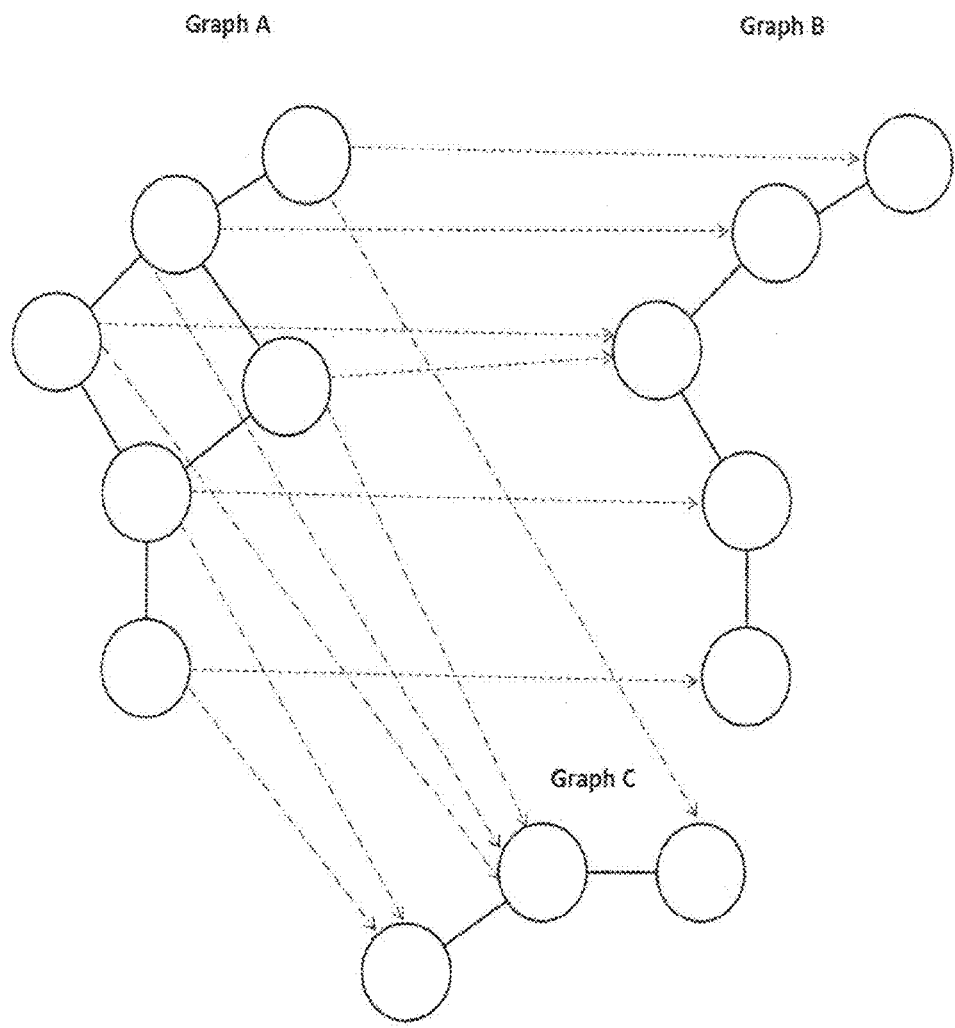
FIG. 17 is a diagrammatic view depicting relationships among more than two computer-represented graphical models.

The system 20 has thus far been illustrated and described in the context of detecting inconsistencies between two computer-represented graphical models, e.g., Graph A and Graph B. In certain example embodiments, the system may also help maintain consistency between more than two graphs by defining relationships from one graph to a set of other graphs, for example. For instance, FIG. 17 shows Graph A having a relationship defined to Graph B (dashed lines) and a relationship to Graph C (dashed dotted lines).

The system 20 may be implemented, at least in part, with instructions encoded and stored on non-transient storage medium for execution by a processor. As such, the following considerations may apply:

The model consistency check unit 32 and particularly the executable code comprising same has a persistent representation of the graphs (e.g., Graph A and Graph B) and an API to access information about the graphs (nodes and connections).

The model consistency check unit 32 and particularly the executable code comprising same provides a way to persist the mapping between the different graphs.

The model consistency check unit 32 and particularly the executable code comprising same provides a way to persist the different relationships between the graphs.

The above considerations serve, e.g., to enable model consistency check unit 32 and particularly the executable code comprising the same to manage relationships between different graphs and to solve inconsistencies.

Figure 18:
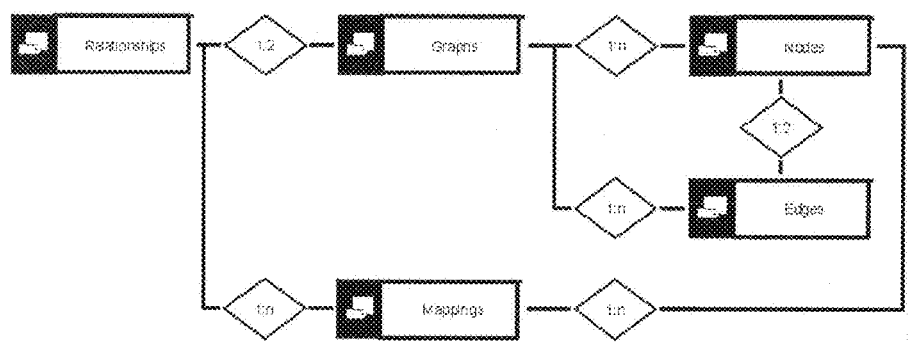
FIG. 18 is a diagrammatic view depicting an ERM example representation of at least portions of a database of a graphical model consistency system according to an example embodiment.
Figure 19:
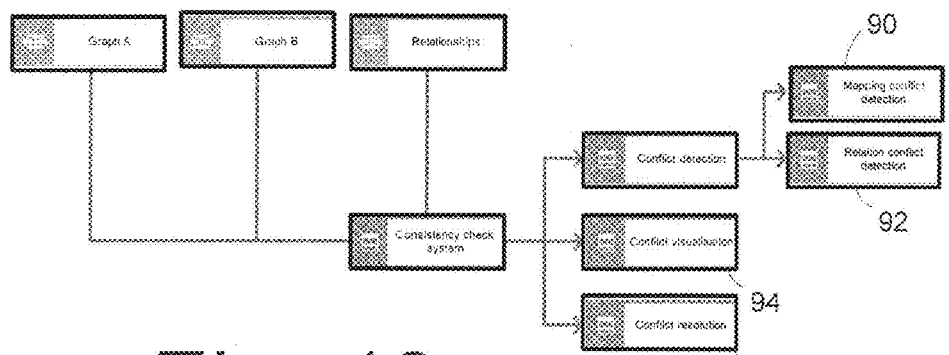
FIG. 19 is a diagrammatic view depicting an ERM example representation of at least portions of a server of a graphical model consistency system according to an example embodiment.

FIG. 18 depicts an entity-relationship (meta)model (ERM) example representation of at least portions of a graphical model consistency system 20, showing database schema, e.g., of database 24, which satisfies the considerations mentioned above. FIG. 19 shows ERM example representation of at least portions of an example implementation of server 22, which satisfies the considerations mentioned above.

FIG. 19 thus shows an example for an implementation particularly of server 22 of the graph consistency system 20. The inputs (Graph A; Graph B, and the relationships [e.g., the model correlation information]) can be read from database 24 or can be provided by a graph based information software system. The graph consistency check system comprises three basic parts by using the control flow from FIG. 16. A first party comprises conflict detection. This part is used to detect possible conflicts between graph A and graph B based on the input parameter relationships. The conflict detection system includes the subsystems for the mapping conflict detection (e.g., map completeness checker 90), which detects mapping conflicts, and the subsystem relationship conflict detection (e.g., relationship checker 92, which detects relationship conflicts as described above).

The second part of the graph consistency check system is the conflict visualization. This conflict visualization part, discussed above with respect to conflict illustrator 94, is used to display the conflicts (detected in the conflict detection system) to the user. This can happen in different ways, for example, as a list or graphical in a split view with the both graphs.

A third part is the conflict resolution system. This part (depicted by relationship resolver 98) provides the user the functionality to solve the detected conflicts. This system can be relatively simple by allowing the user to create or delete mappings between the graphs or it can be more complex by providing the user useful solutions for a conflict.

As understood from the foregoing, the client device 26 includes client processor 60. The client processor 60 is configured to execute a client application program that comprises coded instructions stored on non-transitory media (e.g., stored in client application program memory 66). Execution of the coded instructions of the client application program cause a prompting for client device user input to facilitate various actions. Such actions include, by way of example, creation, in database 24 of the system, model correlation information which defines at least one relationship type between the first model and the second model and which comprises a mapping of objects of the first model and the second model. The actions further include initiation, by server 22, of the model consistency check procedure and (optionally) resolution of the inconsistency detected by the model consistency check procedure. Examples of how the foregoing input is requested and obtained by client device 26 are further described below.

Figure 20:
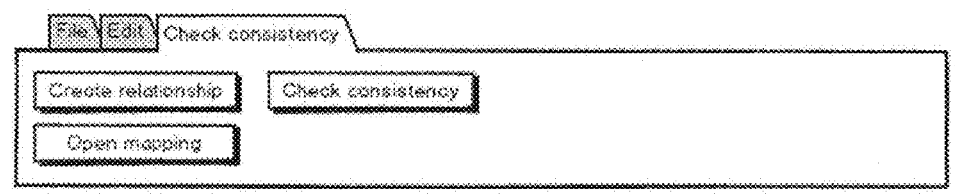
FIG. 20 is a diagrammatic view depicting an example representation of an entry point for an example implementation of a client device according to an example embodiment.

FIG. 20 concerns an example for an implementation particularly of client device 26 of the graph consistency system 20. FIG. 20 particularly shows an end-user entry point for the functionality of the graph consistency system. A menu shown in FIG. 20 comprises following entries, each reflecting a different user-initiated activity: (1) create relationship; (2) open mapping; and (3) check consistency. Each of these and other user-initiated activities is described below.

The create relationship activity is always available to the user of client device 26. The user can create a new relationship between two models and determine their relationship type, as previously described with respect to FIG. 12. The user also may maintain the initial mapping between the two graphs by a second step/input page such as that depicted by previously-discussed FIG. 13.

Figures 21A, 21B:
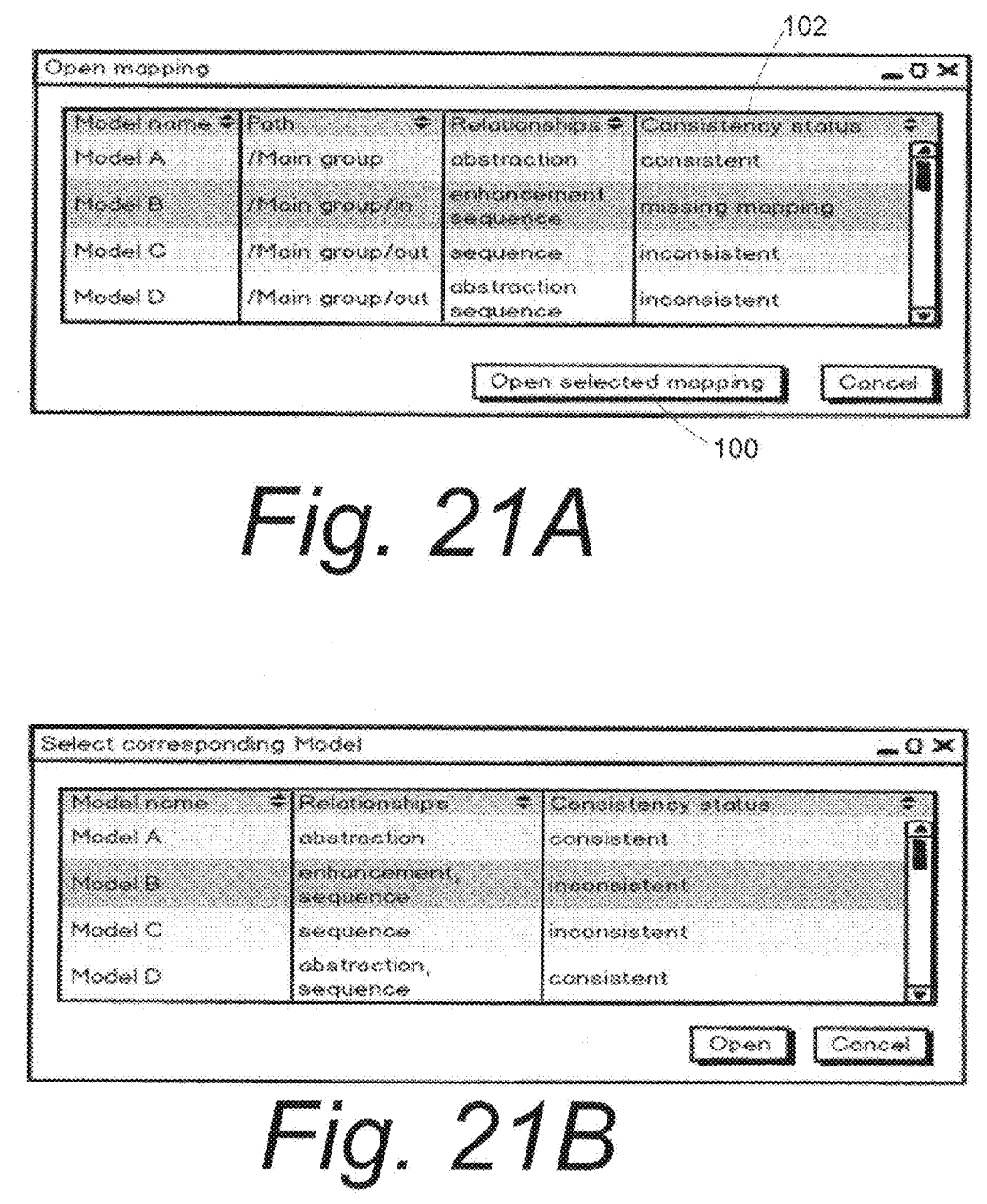

The open mapping activity available to the user of client device 26 is depicted by the example screen of FIG. 21A. The screen of FIG. 21A enables opening of the mapping between two graphs by the "open mapping" menu action depicted by button 100. A dialog 102 of FIG. 21A will appear to enable the end-user to select which relationship which the user desires to maintain. Such is the case if a graph has relationships to multiple other graphs. Otherwise, the mapping view will be displayed immediately.

Figure 22:
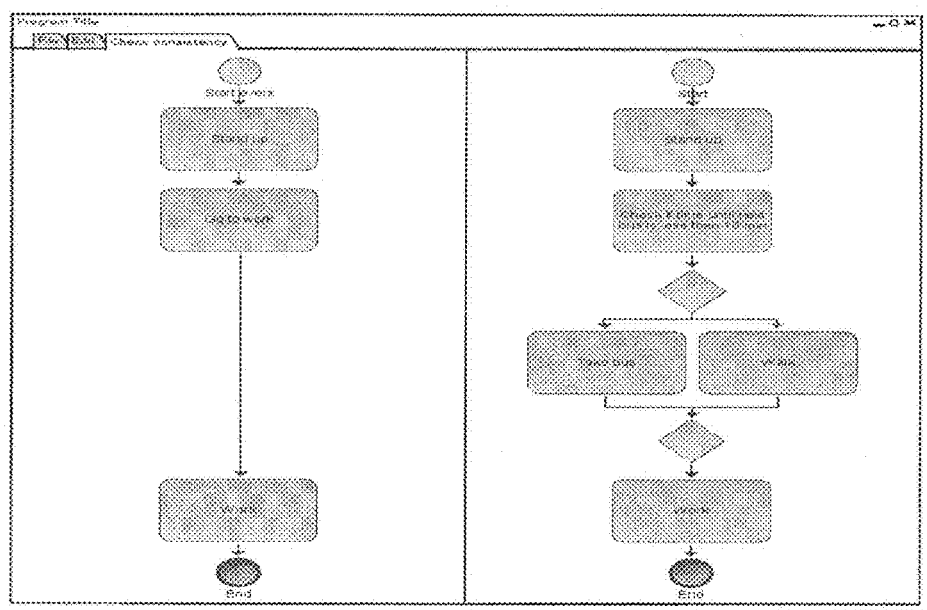
FIG. 22 is a diagrammatic view depicting an example representation of a mapping view for a client device that displays two related graphs side-by-side according to an example embodiment.

Another activity that may be available to the user of client device 26 is obtaining a mapping view that displays two related graphs side-by-side, in the manner of FIG. 22. In the mapping view activity such as that shown in FIG. 22, selecting any node on one of the graphs will—if a mapping for this node already exists—highlight its counterpart on the other graph. In particular, on the left hand side of the screen of FIG. 22 any node selected by the user will appears with a dotted rectangle around it; while on the right side of the screen the counterpart nodes (of the node currently selected on the left portion of the screen) are depicted with their borders having a thick(er) solid line than other nodes.

Figure 23:
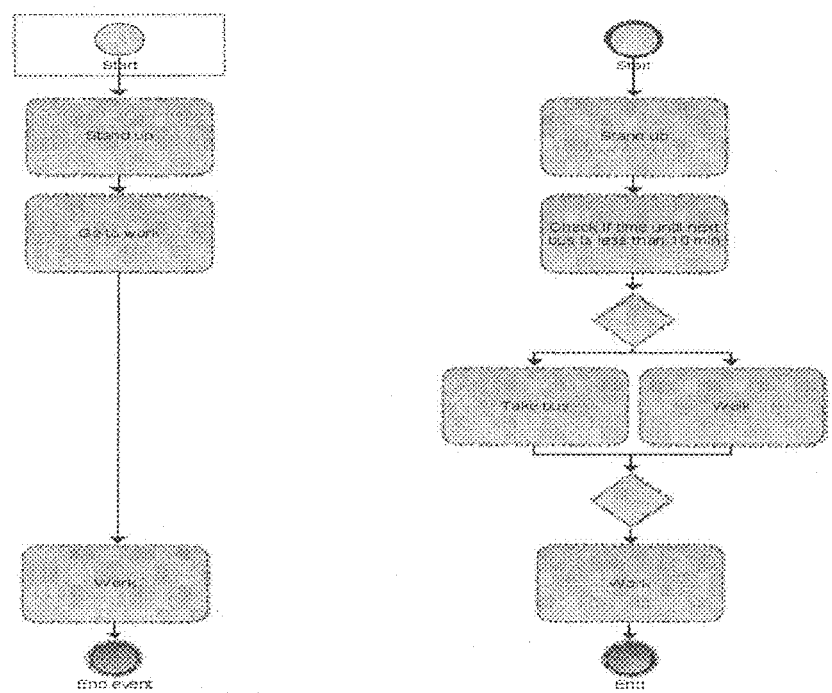
FIG. 23 is a diagrammatic view depicting an example representation of a screen presented at a client device for an initial mapping activity according to an example embodiment.
Figure 24:
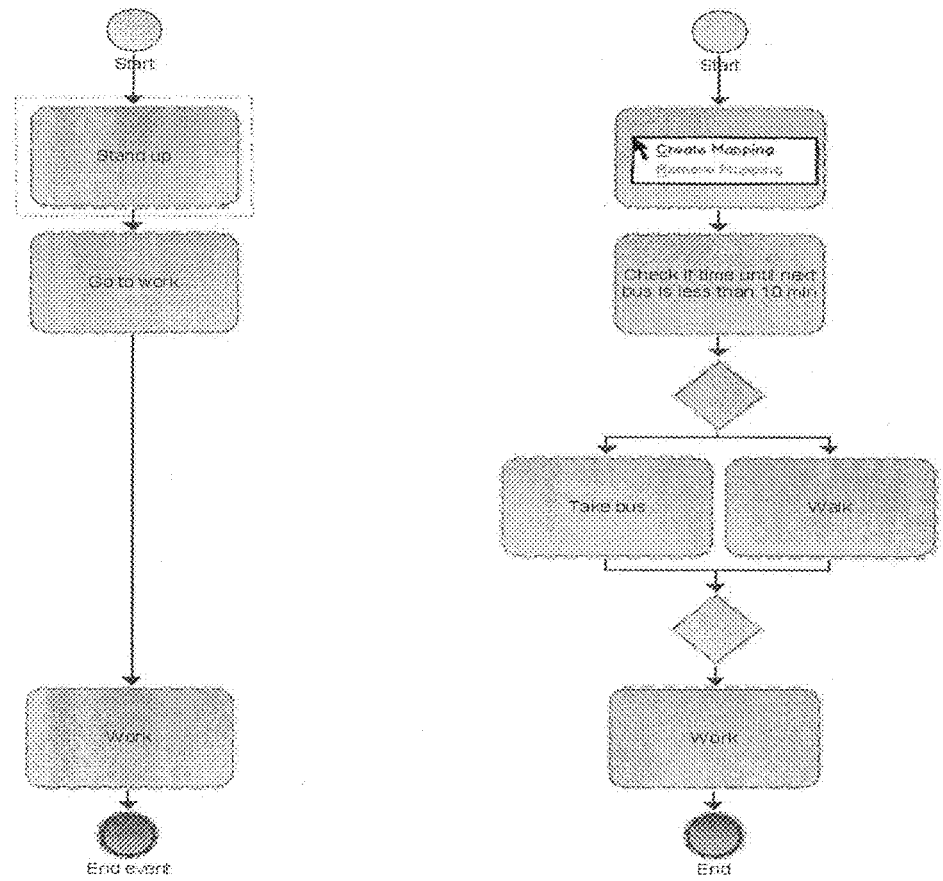
FIG. 24 is a diagrammatic view depicting an example representation of a screen presented at a client device for a maintain mappings activity according to an example embodiment.

In an example embodiment, the check consistency activity available to the user of client device 26 is available to the user of client device 26 if the open mapping screen of FIG. 21A is currently opened at client device 26. All actions (buttons) of FIG. 20 can be triggered only if a model (Graph A) is already selected in the client. The buttons "Open mapping" and "Check consistency" are disabled while no relationship has been created for the selected Graph A. The button "Create relationship" points to a dialog/wizard with two pages (FIG. 12-13). Activating button "Open mapping" results in the screen of FIG. 21A. The dialog contains a list of existing relationship partners (related graphs) of the selected Graph A. The user selects the corresponding Graph B and confirms the dialog. The mapping view (FIG. 22) will appear afterwards. The user can navigate and create/remove mappings in the mapping view (FIG. 23-24). FIG. 21B shows an alternative screen to the screen of FIG. 21A.

The user of client device 26 can trigger the action to execute the graph consistency check for the currently visible relationship using the screen of FIG. 21A. The graph consistency check may be triggered either if a mapping view is already opened, or if a model (Graph A) with at least one relationship defined is selected. In case the user has not yet opened the mapping view we could prompt the user for selecting the corresponding model (see FIG. 21B). Confirming the dialog will lead the user to FIG. 26. The user could be directly leaded to FIG. 26 if a mapping view is already opened.

It is possible to run the consistency check on-the-fly during the modeling. The consistency check can be triggered by the client (e.g., as a background task) if the user changes one of the graph models. If the check has found an inconsistency the inconsistency can be displayed as in FIG. 26.

Upon completion of the consistency check, the client application will stay with the same mapping view as before, but highlight nodes that do not have any mapping or which have been recognized as conflict in terms of the graph consistency check. For example, a node in one graph that does not have any mapping to the other graph (as detected by map completeness checker 90) may be outlined by a dashed line. A node for which a conflict has been detected during the consistency check (detected by relationship checker 92) may have an "X" symbol appearing in its top left corner.

Another activity that may be performed at client device 26 is an initial mapping activity, previously discussed to some extent. FIG. 23 shows an example screen that is presented to a user at client device 26 in conjunction with an initial mapping activity. At the particular time shown in FIG. 23, for Graph A on the left side there is dotted rectangle around the "start" node, depicting focus on the start node of Graph A. The mapping counterpart on Graph B on the right side which has been selected by the user is the start event "Start", which is depicted with thicker boarder line than other nodes. All other nodes in both left and right sides of the screen remain outlined in dashed lines (e.g., have their symbol borders formed with dashed lines) as long as they are not yet part of any mapping.

Another activity that may be performed at client device 26 is a maintain mappings activity, which is understood with reference to the screen of FIG. 24. Using the screen of FIG. 24, the user of client device 26 may select the node for which the user wants to modify the mapping. Right-clicking a node on the other graph opens a context menu. The context menu holds two options that are enabled or disabled depending on the target node, i.e., the node that has been right-clicked. An option "Create Mapping" is available if the target node is not already part of any mapping (dashed border). An option "Remove Mapping" is enabled if the target node is already part of any mapping. It does not matter if the target node is counterpart of the currently selected node (thick solid border) or of any other node (not highlighted). The "Create Mapping" functionality could also be implemented by drag-and-drop functionality. For instance, a node may be dragged from one graph to the other one and dropped at the position of its counterpart.

Figure 25:
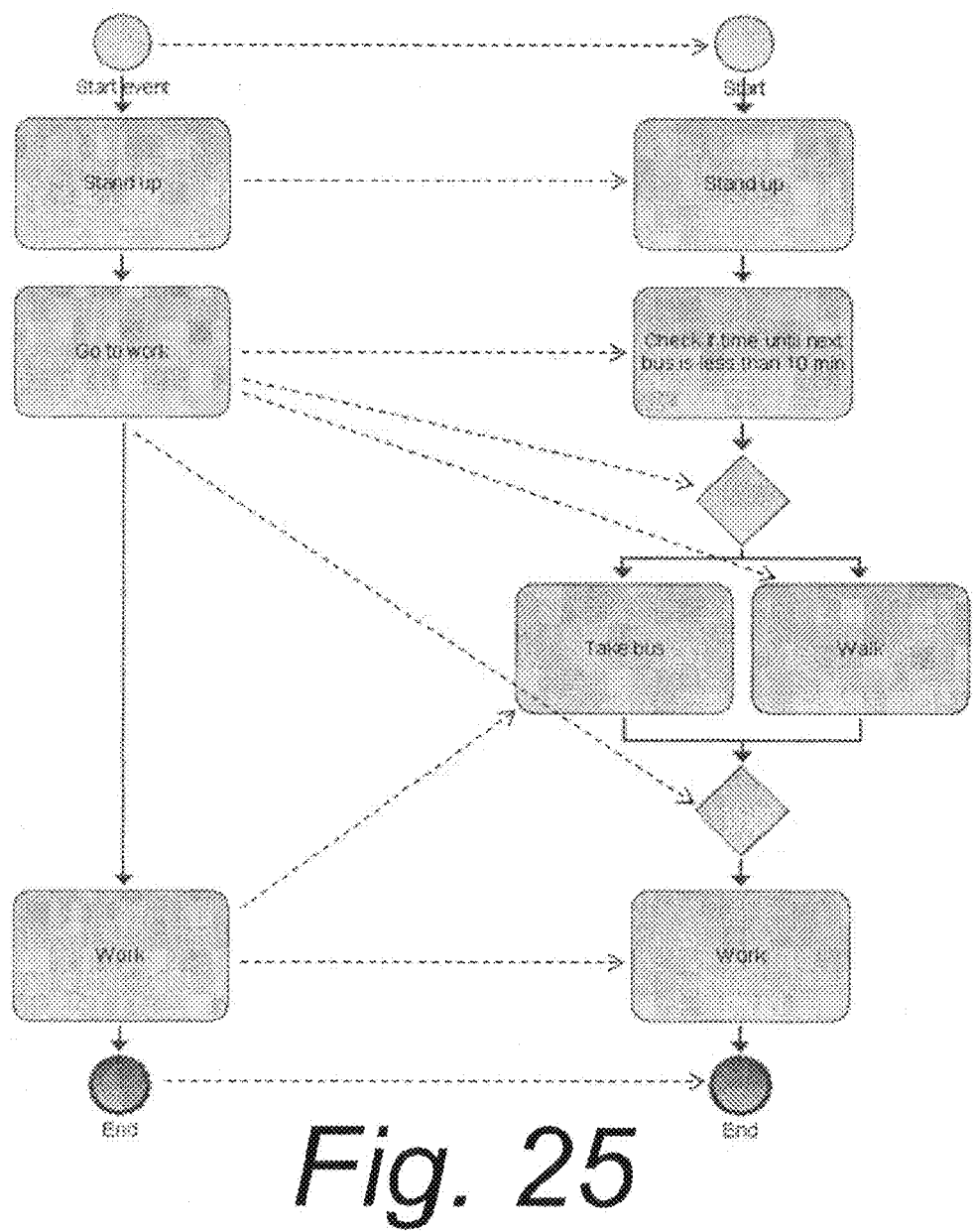
FIG. 25 is a diagrammatic view depicting example graphs supposedly having an enhancement sequence relationship.
Figure 26:
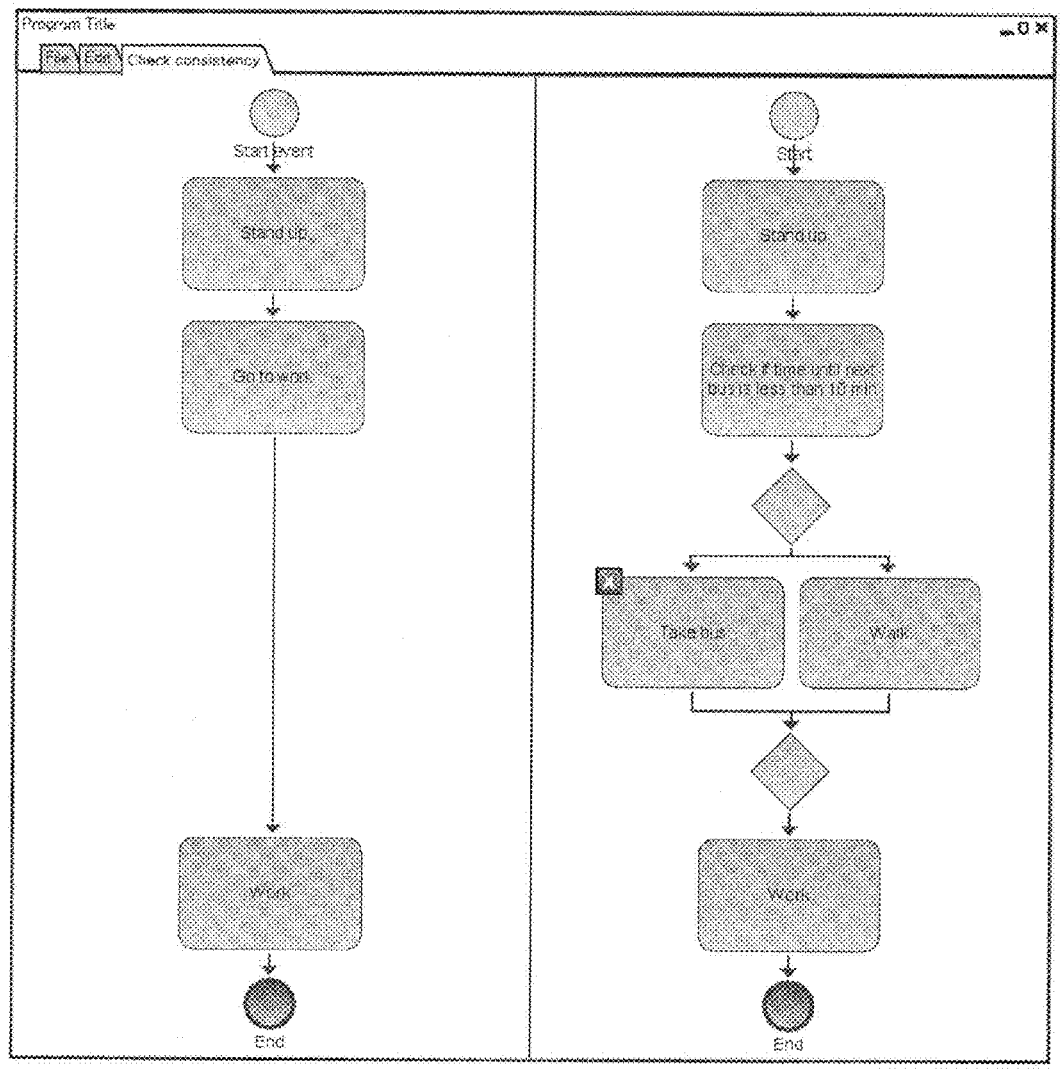
FIG. 26 is a diagrammatic view depicting an example representation of a screen presented at a client device by a conflict illustrator after performance of a model consistency check procedure for the graphs of FIG. 25, according to an example embodiment.

As mentioned above, relationship checker 92 detects relationship inconsistencies. FIG. 25 shows a current state of a mapping between two graphs, a left graph and a right graph, supposedly having an enhancement sequence relationship. When a consistency check is requested, however, model consistency check unit 32 and particularly relationship checker 92 will detect a conflict. FIG. 26 is an example depiction of such conflict as portrayed by conflict illustrator 94.

As seen from FIG. 26, the task "Take bus" is a conflict in terms of relationship type sequence. The reason is that the task "Walk" and the gateway in front of task "Work" do not appear sequentially before task "Take bus" on the right graph. But indeed the mapping counterpart on the left side does appear in front of the counterpart of task "Take bus". This conflict can be solved by removing the bad mapping between task "Work" and task "Take bus".

It was mentioned above that model correlation information, also known as the "mapping table" and/or "correlation table" may be stored in memory section 54 of database 24. FIGS. 27A-27E show an example scenario of storage of model descriptive information and how model correlation information in a form of a mapping or correlation table is formed therefrom. FIGS. 27A-27E show a set of tables for illustrating an example data model based on an entity relationship diagram of FIG. 18 with example data for source and target of FIG. 14B. The tables of FIGS. 27A-27E describe how the information of the graph models (e.g., database memory section 52 of FIG. 9) and the mapping information in model correlation information memory section 54 is stored. The information may be stored in relational tables and may be accessed or retrieved by using Structured Query Language (SQL) to query the tables through the database interface 42. This is only one example possible example of a data model suitable for use by the technology disclosed herein, since other kinds of data models based on Extensible Markup Language (XML) or Objection relations are also possible. The data model of FIGS. 27A-27E is shown in simplified form in that, e.g., position data is not expressly depicted in the node table. Moreover, the data model of FIGS. 27A-27E is an example for a data model for a directed graph. Undirected graphs may be supported by extending the edges table with a column "is directed". Based on this model it would be possible to define SQL statements which have mapping to the pseudo-code statements. For example, the statement "all nodes of Graph X" can be mapped to the SQL statement "SELECT * from TABLE Nodes WHERE Graph_ID==1" (if 1 is the ID of the model "Graph X"). The correlation information memory section 54, e.g., the mapping table, may include the required node information as understood with reference to FIG. 27A-FIG. 27B, which may then be processed by model consistency check unit 32.

Figure 28:
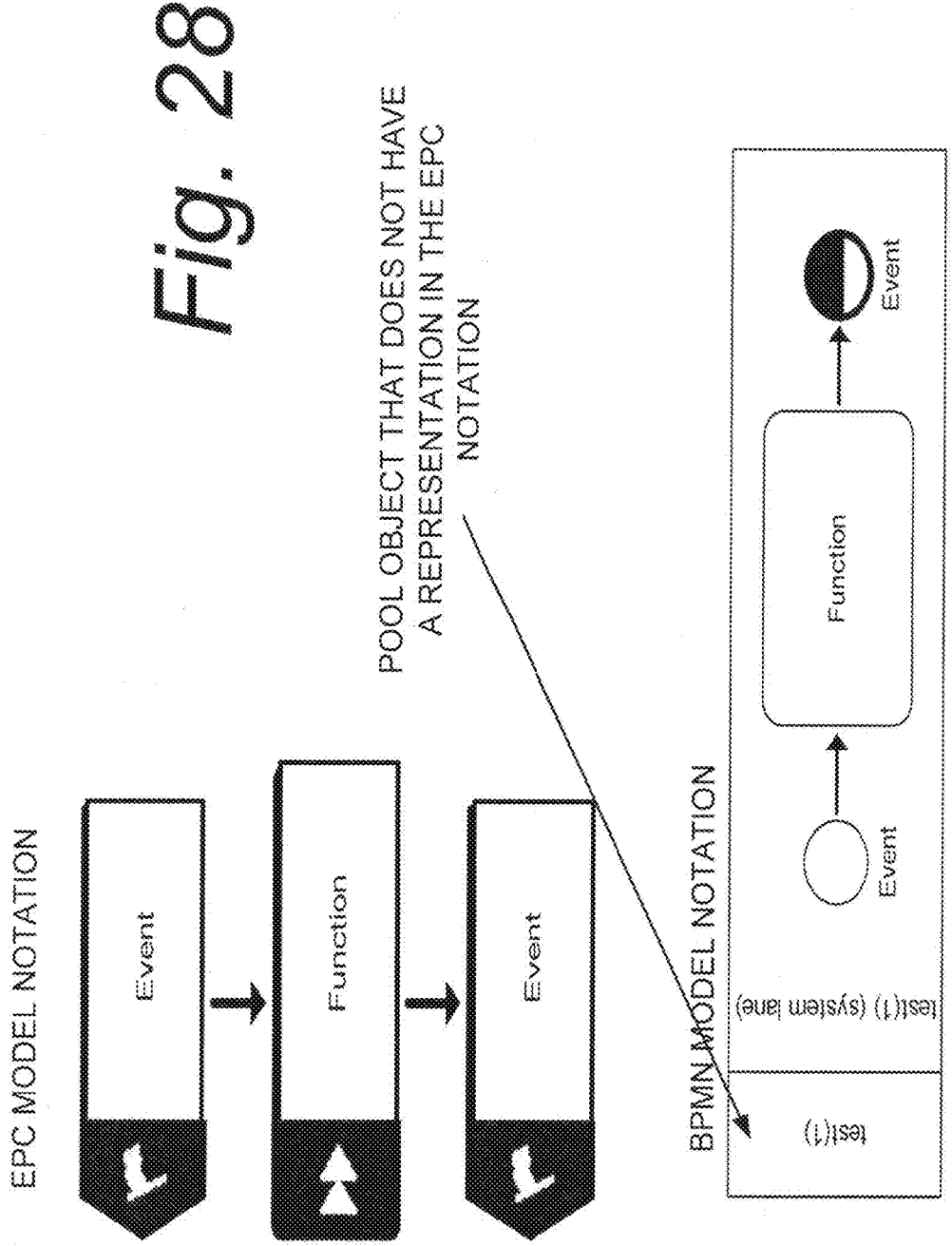
FIG. 28 is a diagrammatic view showing an example scenario of model descriptive information in which one notation contain elements that have no representation in the other notation.

If a notation (e.g., UML/BPMN/EPC) independent data model is used, then the system can basically work without any adaptations between model notations (e.g., EPC-BPMN). A side effect that different notations can have is that one notation can contain elements that have no representation in the other notation. For example, as illustrated in FIG. 28, a BPMN Collaboration diagram may contain Pool Objects, but a corresponding EPC has no representation of a Pool (because the pool is an element that is important for the execution of the BPMN model, EPC models are normally not designed for direct execution). For such elements it is required to filter the Node table so that they are not considered in the consistency check (or the user should have the ability to mark these elements manually to ignore them, e.g., add an additional table that marks node ids that are ignored during the consistency check).

It will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of checking consistency between a first computer-represented graphical model and a second computer-represented graphical model, the method comprising:
    obtaining model correlation information, stored in a memory of an information processing system, that defines at least one relationship type between the first computer-represented graphical model, including a graph-based model, and the second computer-represented graphical model, including a graph-based model, and which comprises a mapping of objects of the first computer-represented graphical model to objects of the second computer-represented graphical model;
    checking consistency between the first computer-represented graphical model and the second computer-represented graphical model using, at least, the model correlation information stored in the memory of the information processing system; and
    ascertaining, using at least one processor, an inconsistency between extant versions of the first computer-represented graphical model and the second computer-represented graphical model using the model correlation information including the relationship type.

2. The method of claim 1, wherein the model correlation information comprises a bidirectional mapping of the objects of the first computer-represented graphical model to the objects of the second computer-represented graphical model at a time when the model correlation information is created.

3. The method of claim 1, wherein the at least one relationship type has been selected at the creation time from plural potential relationship types.

4. The method of claim 1, further comprising:
    prompting for corrective input to resolve the inconsistency; and
    resolving the inconsistency in accordance with the corrective input.

5. The method of claim 1, further comprising using the at least one relationship type to select an appropriate one of plural inconsistency detection logic modules to execute to ascertain the inconsistency.

6. The method of claim 1, wherein the at least one relationship type is at least one of (A) an enhancement relationship; (B) an abstraction relationship; (C) a sequence relationship; (D) a connection abstraction relationship; (E) a connection enhancement relationship; and (F) a combination of two or more of (A)-(E).

7. The method of claim 1, wherein the ascertaining of the inconsistency further comprises checking completeness of objects comprising the model correlation information against objects of the extant versions of the first computer-represented graphical model and the second computer-represented graphical model.

8. The method of claim 7, further comprising prompting for an input indicative of how to resolve object incompleteness of the model correlation information.

9. The method of claim 7, further comprising performing a bidirectional checking of completeness of the objects comprising the model correlation information by finding any missing object in the second computer-represented graphical model from a perspective of the first computer-represented graphical model and finding any missing object in the first computer-represented graphical model from a perspective of the second computer-represented graphical model.

10. The method of claim 1, further comprising creating the model correlation information by:
    generating an input prompt for input specifying the at least one relationship type between the first computer-represented graphical model and the second computer-represented graphical model, and
    generating an input prompt to facilitate the mapping of the objects of the first computer-represented graphical model to the objects of the second computer-represented graphical model.

11. The method of claim 1, further comprising:
    obtaining model correlation information that defines at least one relationship type between the first computer-represented graphical model and both the second computer-represented graphical model and a third computer-represented graphical model, including a graph-based model, the model correlation information also comprising a mapping of objects of at least one of the first computer-represented graphical model and the second computer-represented graphical model to objects of the third computer-represented graphical model;
    after the model correlation information including the relationship type has been created,
    using the model correlation information including the relationship type to ascertain an inconsistency between extant versions of the first computer-represented graphical model, the second computer-represented graphical model, and the third computer-represented graphical model.

12. The method of claim 1, wherein the mapping of objects includes, at least, a connection, association, and/or correlation between at least one node in the first computer-represented graphical model and at least one node in the second computer-represented graphical model.

13. The method of claim 1, wherein the model correlation information defines at least one relationship type between nodes in the first computer-represented graphical model and nodes in the second computer-represented graphical model.

14. The method of claim 1, wherein the graph-based model includes one or more nodes and one or more edges.

15. The method of claim 1, wherein the graph-based model corresponds to a displayed graph having at least two nodes and at least one edge and depicting a flow of processes.

16. A non-transitory computer-readable storage medium tangibly storing instructions that, when executed by the at least one processor, cause the at least one processor to provide execution comprising:
    obtaining model correlation information, stored in a memory of an information processing system, that defines at least one relationship type between the first computer-represented graphical model, including a graph-based model, and the second computer-represented graphical model, including a graph-based model, and which comprises a mapping of objects of the first computer-represented graphical model to objects of the second computer-represented graphical model;
    checking consistency between the first computer-represented graphical model and the second computer-represented graphical model using, at least, the model correlation information stored in the memory of the information processing system; and
    ascertaining, using at least one processor, an inconsistency between extant versions of the first computer-represented graphical model and the second computer-represented graphical model using the model correlation information including the relationship type.

17. A system configured to check consistency between a first computer-represented graphical model and a second computer-represented graphical model, the system comprising:
    a data storage device storing, at least, model correlation information that defines at least one relationship type between the first computer-represented graphical model including a graph-based model, and the second computer-represented graphical model, including a graph-based model, and which comprises a mapping of objects of the first computer-represented graphical model to objects of the second computer-represented graphical model at a time when the model correlation information is created;
    at least one processor configured to perform, after creation of the model correlation information, a model consistency check procedure that uses the model correlation information including the relationship type to check consistency between the first computer-represented graphical model and the second computer-represented graphical model, and to ascertain an inconsistency between extant versions of the first computer-represented graphical model and the second computer-represented graphical model.

18. The system of claim 17, wherein the model correlation information comprises a bidirectional mapping of the objects of the first computer-represented graphical model to the objects of the second computer-represented graphical model at the time the model correlation information is created.

19. The system of claim 17, wherein the at least one relationship type has been selected from a list of predefined relationship types.

20. The system of claim 17, further comprising a client device comprising at least one processor configured to provide a user client with an interface configured to facilitate:
    creation of the model correlation information;
    initiation of a model consistency check procedure; and
    resolution of an inconsistency detected by the model consistency check procedure.

21. The system of claim 20, wherein the resolution of the inconsistency is facilitated by receiving input indicating how to resolve the inconsistency.

22. The system of claim 20, wherein the at least one processor is configured to use the relationship type to select an appropriate one of plural inconsistency detection logic modules to execute to ascertain the inconsistency.

23. The system of claim 22, wherein the at least one relationship type is at least one of (A) an enhancement relationship; (B) an abstraction relationship; (C) a sequence relationship; (D) a connection abstraction relationship; (E) a connection enhancement relationship; and (F) a combination of two or more of (A)-(E).

24. The system of claim 20, wherein the at least one processor is configured to check completeness of objects comprising the model correlation information against objects of the extant versions of the first computer-represented graphical model and the second computer-represented graphical model.

25. The system of claim 20, wherein the first computer-represented graphical model and second computer-represented graphical models represent different views of a common business process at the same or different points in time.

26. A non-transitory computer-readable storage medium tangibly storing coded instructions that, when executed by a processor, prompt for user input to facilitate:
    creation, in a data store of the computerized system, model correlation information that defines at least one relationship type between a first computer-represented graphical model, including a graph-based model, and one or more second computer-represented graphical models, including graph-based models, and which comprises a mapping of objects of the first computer-represented graphical model and each of the one or more second computer-represented graphical models;
    initiation, by a server of the system, of a model consistency check procedure which uses the model correlation information including the relationship type to check consistency between the first computer-represented graphical model and the second computer-represented graphical model, and to ascertain an inconsistency between extant versions of the first computer-represented graphical model and the one or more second computer-represented graphical models; and,
    resolution of the inconsistency detected by the model consistency check procedure.

27. The computer-readable storage medium of claim 26, wherein the mapping is a bidirectional mapping of at least objects in the computer-represented graphical models.

28. The computer-readable storage medium of claim 27, wherein the mapping is automatically generated, at least in part, based on predefined mappings.

* * * * *